US008612331B2

(12) United States Patent
Hanson et al.

(10) Patent No.: US 8,612,331 B2
(45) Date of Patent: Dec. 17, 2013

(54) PREDICTION MARKET SYSTEM AND METHODS

(75) Inventors: Robin Hanson, Burke, VA (US); Brad Wilson, Franklin, TN (US); Adam Parod, Murfreesboro, TN (US); David Savage, Baxter, TN (US)

(73) Assignee: Consensus Point, Inc., Nashville, TN (US)

( * ) Notice: Subject to any disclaimer, the term of this patent is extended or adjusted under 35 U.S.C. 154(b) by 0 days.

(21) Appl. No.: 13/278,424

(22) Filed: Oct. 21, 2011

(65) Prior Publication Data

US 2012/0101933 A1    Apr. 26, 2012

Related U.S. Application Data

(60) Provisional application No. 61/405,352, filed on Oct. 21, 2010.

(51) Int. Cl.
| | | |
|---|---|---|
| *G06Q 40/00* | (2012.01) | |
| *G06Q 30/02* | (2012.01) | |
| *G06Q 40/04* | (2012.01) | |
| *G06Q 40/02* | (2012.01) | |
| *G06Q 40/06* | (2012.01) | |

(52) U.S. Cl.
CPC ............ *G06Q 40/00* (2013.01); *G06Q 30/0202* (2013.01); *G06Q 40/04* (2013.01); *G06Q 40/02* (2013.01); *G06Q 40/06* (2013.01)
USPC .............................................. 705/37; 705/35

(58) Field of Classification Search
CPC ... G06Q 40/00; G06Q 40/04; G06Q 30/0202; G06Q 40/02; G06Q 40/06
USPC ....................................................... 705/37, 35
See application file for complete search history.

(56) References Cited

U.S. PATENT DOCUMENTS

| | | | | |
|---|---|---|---|---|
| 6,405,180 | B2 * | 6/2002 | Tilfors et al. | 705/36 R |
| 6,684,190 | B1 * | 1/2004 | Powers et al. | 705/36 R |
| 6,912,511 | B1 * | 6/2005 | Eliezer et al. | 705/37 |
| 7,299,204 | B2 | 11/2007 | Peng | |
| 7,337,135 | B1 | 2/2008 | Findlay | |
| 7,356,498 | B2 | 4/2008 | Kaminsky | |
| 7,386,499 | B2 | 6/2008 | Kocher | |
| 7,451,213 | B2 | 11/2008 | Kaplan | |
| 7,546,543 | B2 * | 6/2009 | Louch et al. | 715/762 |
| 7,765,491 | B1 * | 7/2010 | Cotterill | 715/833 |
| 7,835,972 | B2 * | 11/2010 | Almeida et al. | 705/37 |
| 7,987,130 | B2 * | 7/2011 | Waldron et al. | 705/36 R |
| 2003/0135445 | A1 | 7/2003 | Herz | |
| 2004/0064394 | A1 * | 4/2004 | Wallman | 705/36 |
| 2006/0069635 | A1 * | 3/2006 | Ram et al. | 705/37 |
| 2006/0106743 | A1 * | 5/2006 | Horvitz | 706/21 |
| 2006/0235786 | A1 * | 10/2006 | DiSalvo | 705/37 |

(Continued)

OTHER PUBLICATIONS

Almenberg, J., Kittlitz, K., & Pfeiffer, T. (2009). An experiment on prediction markets in science. PLoS One, 4(12) doi:http://dx.doi.org/10.1371/journal.pone.0008500 Retrieved Sep. 5, 2013.*

*Primary Examiner* — Kito R Robinson
(74) *Attorney, Agent, or Firm* — Triangle Patents, PLLC

(57) ABSTRACT

Systems and methods for operating a prediction market, including methods for finding disagreement with the consensus among participants and methods for managing liquidity. Also, an interactive user interface to facilitate investing, with one user action, in a prediction market.

13 Claims, 30 Drawing Sheets

(56) References Cited

U.S. PATENT DOCUMENTS

| | | |
|---|---|---|
| 2007/0250429 A1 | 10/2007 | Walser |
| 2007/0265954 A1* | 11/2007 | Mather et al. .................. 705/37 |
| 2008/0319825 A1 | 12/2008 | LaComb |
| 2009/0076939 A1 | 3/2009 | Berg |
| 2009/0076974 A1 | 3/2009 | Berg |
| 2009/0182624 A1 | 7/2009 | Koen |
| 2011/0087583 A1* | 4/2011 | Shrem ............................ 705/37 |

* cited by examiner

Figure 10

What will our margin growth be in the second quarter?

| SYMBOL: STOCK NAME | CONSENSUS | CHANGE | VOLUME | |
|---|---|---|---|---|
| MarginGrowthQ2_0:<br>Margin growth in Q2 will be greater than 0% but less than 10% | 46.26%<br>$46.26 | 26.43%<br>+$9.67 | 638 | Buy Sell |
| MarginGrowthQ2_10:<br>Margin growth in Q2 will be greater than 10% but less than 20% | 20.59%<br>$20.59 | $0.00 | 251 | Buy Sell |
| MarginGrowthQ2_20:<br>Margin growth in Q2 will be greater than 20% but less than 30% | 24.05%<br>$24.05 | $0.00 | 0 | Buy Sell |
| MarginGrowthQ2_H:<br>Margin growth in Q2 will be greater than 30% | 16.11%<br>$16.11 | 18.54%<br>+$2.52 | 805 | Buy Sell |
| MarginGrowthQ2-L:<br>Margin growth in Q2 will be less than 0% in Q2 | 3.08%<br>$3.08 | 10.39%<br>+$0.29 | 263 | Buy Sell |

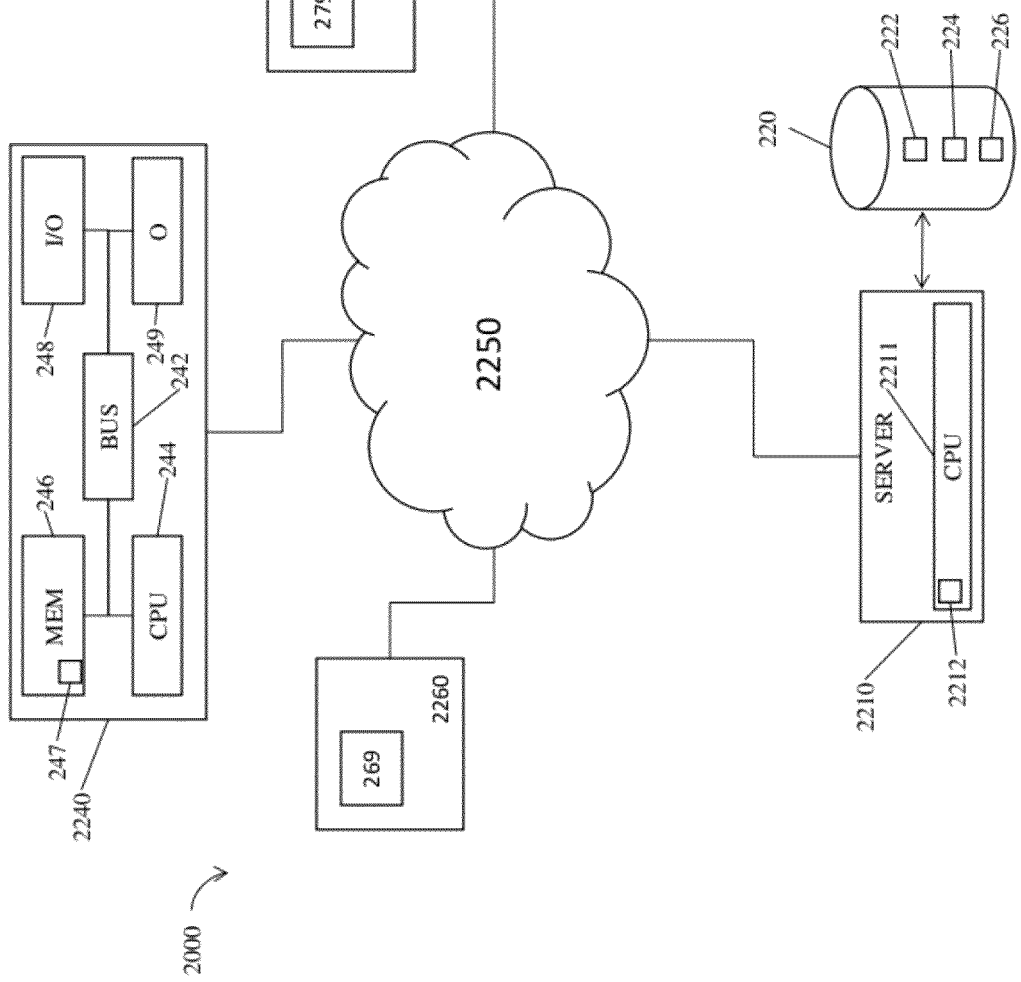

PREDICTION MARKET SYSTEM AND METHODS

BACKGROUND OF THE INVENTION

1. Field of the Invention

The present invention relates to markets in general, and specifically to prediction markets.

2. Description of the Prior Art

Prior art describes prediction markets that are used to determine the likelihood of success of employees' ideas or inventions, or steps in implementing such ideas or inventions, by allowing employees to bet on the success, buy and sell "shares" to indicate their belief in the likelihood of success, or otherwise assign relative weights to survey responses.

U.S. Pat. No. 7,299,204 for a system for winning investment selection using collective input and weighted trading and investing describes a system in which a group of investors (who may have a range of experience in managing investments) vote as to which stocks or other investments should be traded; a weight is assigned to each investor's vote based on his history of selecting "winning" stocks or other investments.

US Pub. No. 20070250429 assigned to Clinical Futures LLC for prediction markets for assessing clinical probabilities of success describes a prediction market for determining the success of an experimental candidate, such as a drug, in terms of meeting goals related to clinical trials and post-clinical trials, such as progressing through various regulatory steps of the trials.

US Pub. No. 20090076939 assigned to Microsoft Corporation for a continuous betting interface to a prediction market describes a system and software in which the forecasting techniques of estimate contests and prediction markets are combined, in which an employee places a bet of a desired amount either in favor of or against an outcome.

US Pub. No. 20090182624 for a method and apparatus for generating and evaluating ideas in an organization describes a prediction market for generating and evaluating employees' ideas in an idea market, specifically designed to predict the value of the idea. The idea market includes an automatic price-setting mechanism that modifies the share price as trades are made.

U.S. Pat. No. 7,356,498 assigned to Chicago Board Options Exchange, Inc. for an automated trading exchange system describes an automated trading system including integrated quote risk monitoring and quote modification, in which the quotes may have investor-defined trading parameters such as risk thresholds. An apparatus which carries out this system matches received quotes and orders to previously placed quotes and orders in order to make a trade, and also determines the risk level of such a trade.

U.S. Pat. No. 7,386,499 for stock trading limit order coupled link describes a system that allows an investor to take advantage of stock price fluctuations without constant monitoring. Further describes that this system will accept a buy order from the investor, buy the stock at the specified price, and automatically submit a sell order at a higher price that is set by the user.

U.S. Pat. No. 7,337,135—assigned to c4cast.com, Inc. for asset price forecasting describes a method for predicting stock prices based on historical data and exogenous variables that are likely to influence the stock price, such as stock prices for companies in the same sector as well as macroeconomic variables.

US Pub. No. 20030135445 for stock market prediction using natural language processing describes a method of using natural language processing to extract information from online news sources and predict changes in stock price based on that information.

US Pub. No. 20080319825 assigned to GE for virtual markets for selecting answers to open-ended questions describes a virtual market system used to rank-order answers to an open-ended question. A virtual market on which participants can trade securities representing answers to the open-ended question is used to gather information from the participants regarding each answer. Additional securities representing additional answers to the question may be added during the trading period, allowing for the answers to the question to evolve over the operation of the market.

US Pub. No. 20090076974 assigned Vierra Magen/Microsoft Corp for a combined estimate contest and prediction market describes an estimate contest wherein users participate in a prediction market for forecasting the outcome of a future event. Users can express risk levels, which may be factored into virtual market trades.

US Pub. No. 20090076939 assigned to Vierra Magen/Microsoft Corp. for continuous betting interface to prediction market describes methods wherein a user participates in trading securities in a prediction market which represents different outcomes of an event, using an interface allowing the user to understand the trade in terms of a bet.

U.S. Pat. No. 7,451,213 assigned to IQ Co. for online forecasting system and method describes systems and methods provide real-time online interactive forecasting of an element, wherein each element has a corresponding input and forecast information, which are submitted back to the user providing the input. A list of elements for forecasting may be provided wherein each element has a forecast that may be provided by a fixed or constant label, or default listing of elements.

US Patent Application 20070250429 by Walser; Bryan L. et al. Oct. 25, 2007 for prediction markets for assessing clinical probabilities of success. Prediction markets are used to determine the probability of an experimental therapeutic, diagnostic, or prophylactic candidate meeting clinical trial and post-trial goals, such as clinical trial endpoints and timelines. The prediction market processes buy and sell orders from market participants, while adjusting the prices of the securities according to the orders. The securities have specific meanings which correspond to goals in clinical trials or other outcomes in clinical candidate development. The price of a security determined by the market corresponds to the probability of the corresponding goal or outcome. The invention includes a liquidity management process configured to provide liquidity of the market and maintain sufficient price movement to maintain interest and trading levels while not distorting pricing signals. The liquidity management process can hold back a certain percentage of the security in the market.

SUMMARY OF THE INVENTION

The present invention relates to prediction markets.

It is an object of this invention to provide methods for operating a prediction market.

Yet another object of this invention is to provide methods for finding disagreement among participants in a prediction market.

A further object of this invention is to provide methods for maintaining liquidity in a prediction market.

Yet another object of this invention is to facilitate investing in a prediction market.

Accordingly, a broad embodiment of this invention is directed to methods for operating a prediction market to find disagreement among participants. Another embodiment of this invention is directed to methods for operating a prediction market using a liquidity management process. Yet another embodiment of this invention is directed toward a user interface that facilitates investing in a prediction market.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 10 is an example of linking stocks according to the invention.

FIG. 13 is an example of the administrator interface of the invention.

FIG. 15 is an example of the stock categories interface of the invention.

FIG. 16 is an example of the suggested stocks interface of the invention.

FIG. 21 is an example of a user addition interface of the invention.

FIG. 30 is a schematic diagram of a networked system and remote server.

DETAILED DESCRIPTION

Figure 1:
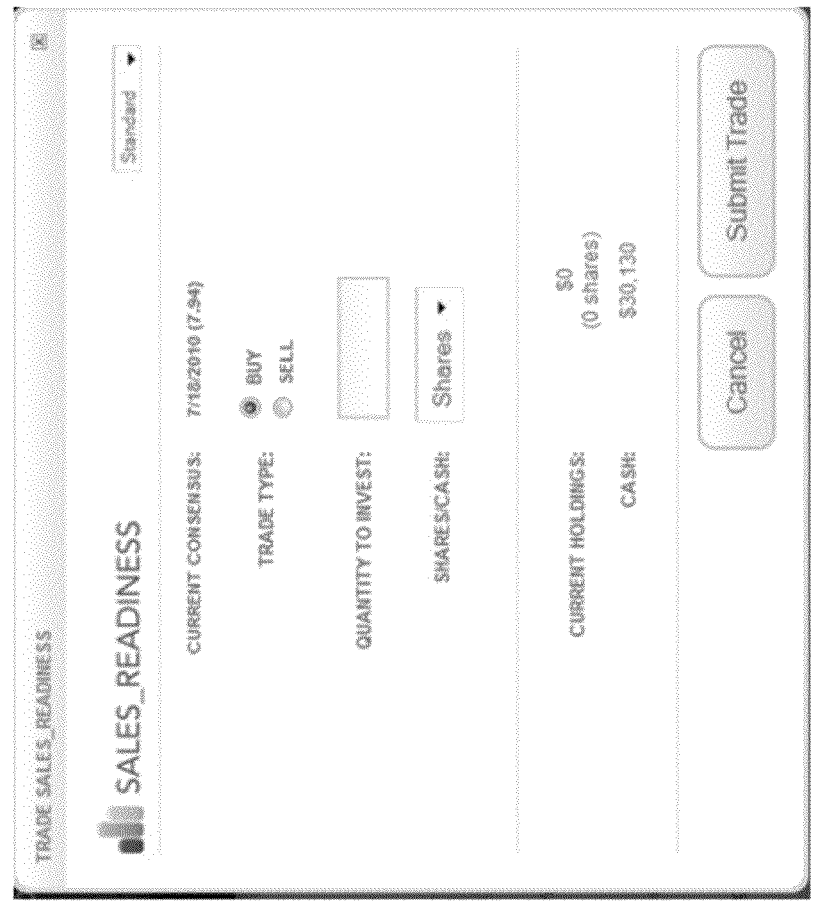
FIG. 1 is a basic user interface of one embodiment of the invention.

In the present invention, the terms "question" and "stock" are synonymous.

Consensus in a hierarchy is frequently biased and thus conceals truthful answers. The purpose of the present prediction market system is to uncover truthful answers to relevant questions by searching for informed disagreement with the consensus answer to a question. The present invention retrieves disagreement by having disagreeing investors make money if they are correct in their disagreement. The reward of disagreement increases the stronger the disagreement with the current consensus. This motivates investors to invest against a stock as soon as they learn new information about the stock. This promotes the timely delivery of disagreement information.

The present invention uncovers disagreement information through the investor review of questions. Investors do not generally invest in questions where they agree with or have no opinion on the current consensus. This has a side effect of identifying bad questions that are unclear, ambiguous, not on target, and the like. Also, investors will comment on bad questions. Thus, the system according to the present invention will help determine which questions are bad and what is the right question.

Additionally, because investors submit questions, the generation of questions by investors helps the administrator identify uncertainty in the business or operation.

The system has several interactive functions that together form a working system that is readily usable by the investors and administrators. These functions are offered to the users on various interfaces.

Thus, the present invention provides for a prediction market system, including a computer system including a server computer and at least one database in electronic, digital communication over a network, connectable or accessible remotely through the network by at least one other remote computing device, the server running a software providing an automated market maker; a liquidity management system (LMS) with administrative controls for the market maker for sensitivity, quantity, fulcrum and window in order to provide enough liquidity so that about all answers receive investment by investors who are potentially informed enough to make an investment, but not so much that investors can invest beyond their informed ability; an investment transaction interface, wherein the investment transaction interface includes an interactive slider interface with a slider control that allows one-step user selection to choose the amount of money to manage and wherein the automated market maker automatically calculates and displays in the investment transaction interface the amount of stock the user is to receive or sell; thereby providing a prediction market system that is intuitive and gives good predictions.

The automated market maker creates liquidity in the system by providing ongoing buy and sell orders that are logarithmically spaced in a price ladder. The automated market maker also provides for double auction by incorporating limit orders. The administrative control for are preferably set as follows: The sensitivity is about 20; the quantity is about 100; the fulcrum is about 50.00 and the window is about 30.

The investment transaction interface permits buying and selling shares with the same slider in a single action. The payout is binary or variable. The stocks are grouped and/or linked.

The system provides for a computer-readable code stored in a storage medium and executable by one or more processors, which when executed provides a prediction market system that includes: an automated market maker; a liquidity management system with administrative controls for the market maker for sensitivity, quantity, fulcrum and window, in order to provide enough liquidity so that so that about all answers receive investment by investors who are potentially informed enough to make an investment, but not so much that investors can invest beyond their informed ability; and an investment transaction interface, wherein the investment transaction interface is a slider interface with a slider that allows the user to move the slider to choose the amount of money to manage and the system automatically calculates and displays in the investment transaction interface the amount of stock the user is to receive or sell; thereby providing a prediction market system that is intuitive and gives good predictions.

The present invention further provides for a computer-readable code stored in a storage medium and executable by one or more processors, which when executed provides an electronic stock and commodities exchange system, the exchange system including an interactive user investment transaction interface; the interface including a slider for choosing the amount of money to manage and wherein the interface calculates the amount of stock and/or commodities the user is to receive or sell. The exchange system and investment transaction interface permit the buying and selling shares, options and combinations therefore with the same slider in a single action.

Questions/Stock Interface

The Questions/Stock interface lists the active questions/stocks in which an investor can invest. The investor may also suggest questions on this interface. Investors preferably also receive an incentive for suggesting questions. For example, an investor may receive 10,000 points for a question that is accepted and used.

Once a question is submitted, the administrator reviews and then either approves or rejects the questions. If a question is approved, the administrator categorizes and tags it and submits it to the market. Questions can then be sorted by categories and/or tags, which facilitate the investors finding questions of interest. Other filters, such as comments or starring questions, can also be used to sort the questions.

Investment Transaction Interface.

Once an investor has chosen a question to invest in, they go to the investment transaction interface for that question/stock. This interface gives details about the question/stock.

The system uses different graphical user interfaces to assist the investors in their investments. The interfaces include a basic interface, a slider interface, and an advanced interface.

Basic Interface

A basic transaction interface, generally described as 100 in FIG. 1, allows a trader to directly enter, either in cash or shares, the amount of investment. The transaction may either be a buy or sell transaction to move the current consensus up or down, respectively. There is no restriction on selling that requires prior ownership of shares prior to selling (also known as short selling). A buy or sell transaction has an immediate cost to the trader that is dependent on the current consensus and their investment decision. For example, it costs $10 to buy a share when the current probability (price) is 10% ($10). Shorting the same share would cost $90 (i.e., $100–$10=$90).

If the trader has previously answered the question and has current shares (long or short) in the question, then those are automatically taken into consideration in the transaction.

Confirmation is provided to the trader that their order has been executed in the system.

Display Value

As with most markets, the current price reflects the aggregation of beliefs and opinions that the participants have about the underlying asset. With a traditional prediction market, the stock price is actually the probability from 0% to 100%, but displayed as $0-$100. Thus, a stock price of $89.20 equates to a probability of 89.20%. However, not all stocks within a prediction market are intended to yield a probabilistic estimate. There are times when a different measurement is more useful, such as a specific date at which a project will be completed. In these cases, the stock price doesn't represent a probability, but the actual value of the forecast. As opinions about the forecast change amongst the participants, the forecasted value will update accordingly.

In the present invention, a number of ways have been developed to represent the price into a form that is more intuitive to the user. These include probabilities, dollar amounts, calendar dates, numbers of items, and a user-defined field to create a custom label. When this feature is utilized, the price is automatically converted from the standard display configuration to one that is contextualized to the particular forecast.

Figure 2:
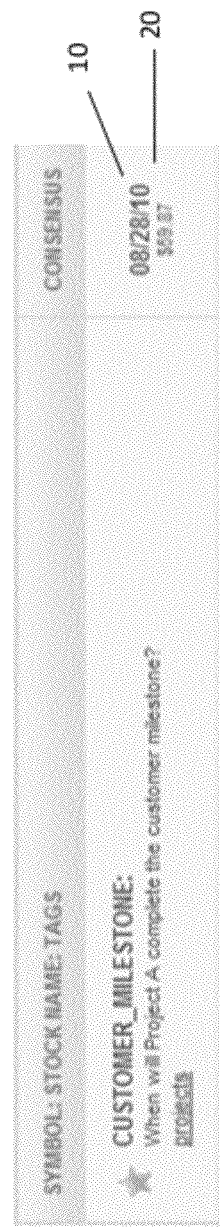
FIG. 2 is another user interface of one embodiment of the invention showing a project completion data.
Figure 3:
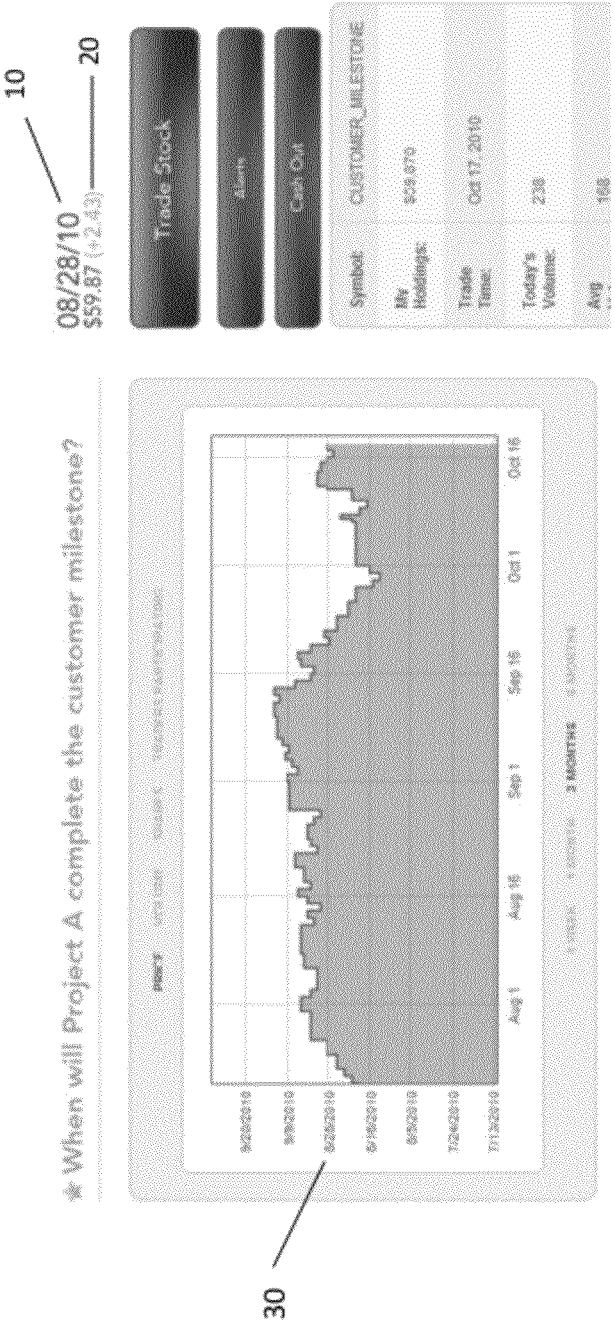
FIG. 3 is another user interface of one embodiment of the invention showing a project completion data.

An example, shown in FIGS. 2 and 3, describe a project completion date. The consensus project completion date 10 and price 20 are shown in FIG. 2. The other possible dates 30 are also shown if FIG. 3. When a user selects an answer date, the interface provides the price.

As stated previously, the benefit of this capability is that it is more intuitive to the user. By representing the stock price as the actual value of the forecast, the participant immediately knows what the current consensus is and they don't need to do any calculations in order to understand what they need to know.

Slider Interface

The system advantageously helps investors to make bets by providing a more interactive interface that provides immediate information regarding investing in an answer or stock.

Figure 4:
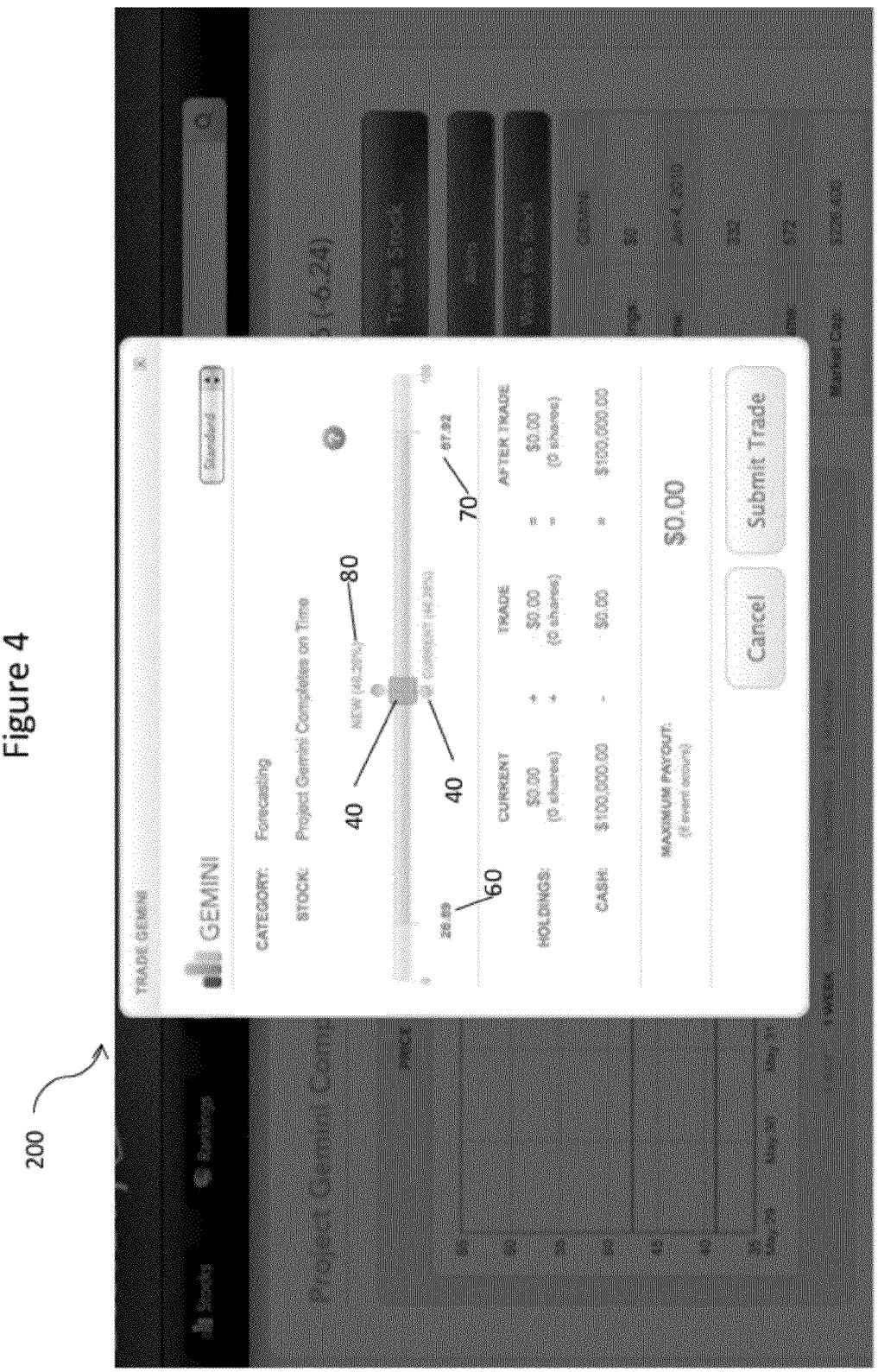
FIG. 4 is another embodiment of the invention showing a slider interface.

The present invention does this by providing a slider interface that helps users understand the complex interactions of making investment in this market. An example of the slider interface, generally described as 200, is shown in FIG. 4.

In many traditional prediction market applications, when a user wants to make a trade, they are presented with an interface that requires them to enter a specific number of shares they want to buy or sell in that transaction. The system then determines how much that trade will cost, and supplies this information to the participant. Unfortunately, this process can be somewhat cumbersome and even confusing to users, especially novices.

As an alternative, the Present invention platform presents an intuitive slider interface that allows the user to vary the amount of money that will be transacted. When a decision to trade has been made and the 'Trade' button is selected, the trading interface automatically overlays the screen, rather than redirecting to a different web page. By default, the slider bar 40 is positioned at the market consensus 50 when it loads. To input a trade, the user simply grabs the slider bar and moves it across the spectrum to the desired position. Additionally, each end of the spectrum 60, 70 is dynamically determined by the amount of money that that particular user is able to use in the transaction. Once the slider bar begins to move, the software platform automatically informs the user the cost of the trade 80.

As individuals tend to think in terms of how much money they want to use, rather than a specific number of shares they want, this unique interface ends up being much more intuitive and informative to those participants. Because trades can be made more quickly and efficiently, users don't have to contend with unnecessary complexity.

During initial investment, as the slider is moved away from consensus, it costs more to invest.

On subsequent investments/divestments, he can get back money or it may cost him money (loss/profit). If the price has changed, he may make more or less money. The profit/loss is determined by these factors:

Average Initial investment price (cost basis)
Consensus price (current price)
Direction of consensus movement (investment direction).
Consider the following examples.

Figure 5:
FIG. 5 is an example use of the slider interface.

Example #1, shown in FIG. 5: New investment; increase consensus from current 24.97 to 27.89. In this example, moving the consensus from 24.97 to 27.89 costs the trader $2702 and provides 100 shares in return.

Figure 6:
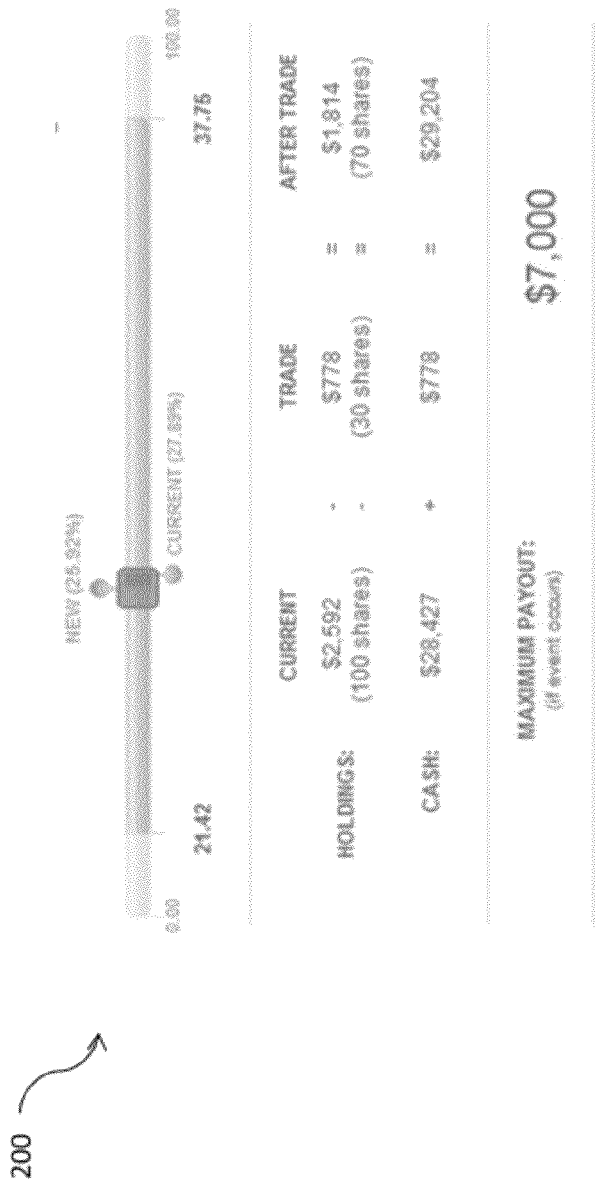
FIG. 6 is another example use of the slider interface.

Example #2, shown in FIG. 6: Second investment; reduce consensus from 27.89 to 25.92. In this example, reducing the consensus effectively reduces the trader's position from 100 to 70 shares (selling 30 shares). The transaction nets a positive cash gain of $778.

Figure 7:
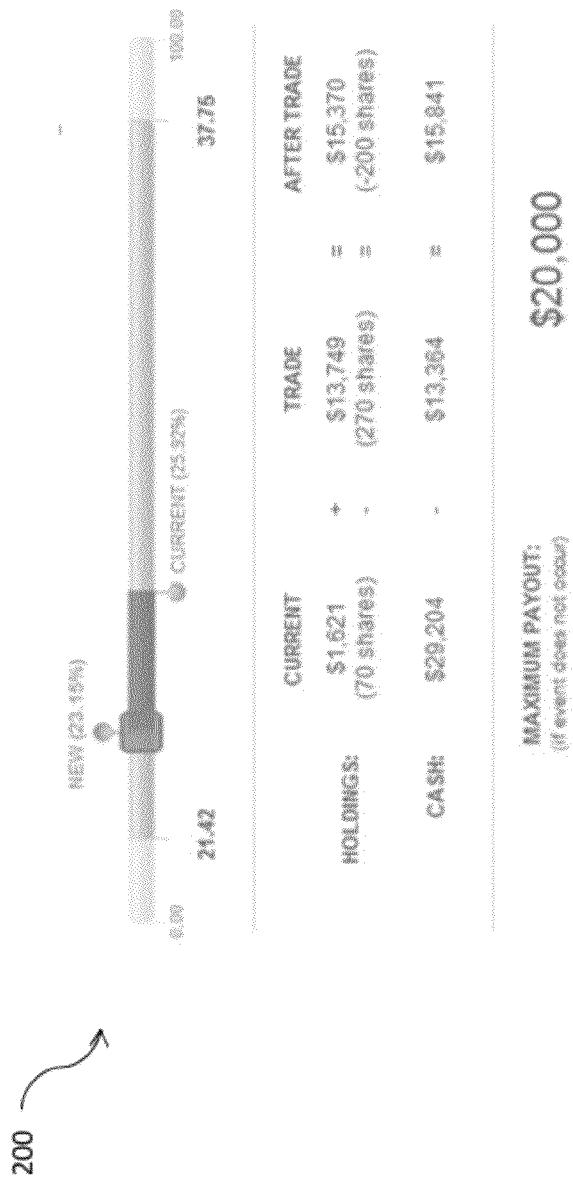
FIG. 7 is another example use of the slider interface.

Example #3, shown in FIG. 7: Third investment; reduce consensus from 25.92 to 23.15. In this example, reducing the consensus effectively reduces the trader's position from 70 to −200 shares (selling 270 shares). The transaction nets a positive cash gain for the first 70 shares sold, but then costs the trader for the remaining 200 shares. The total net cost of the transaction is $13,364.

Figure 8:
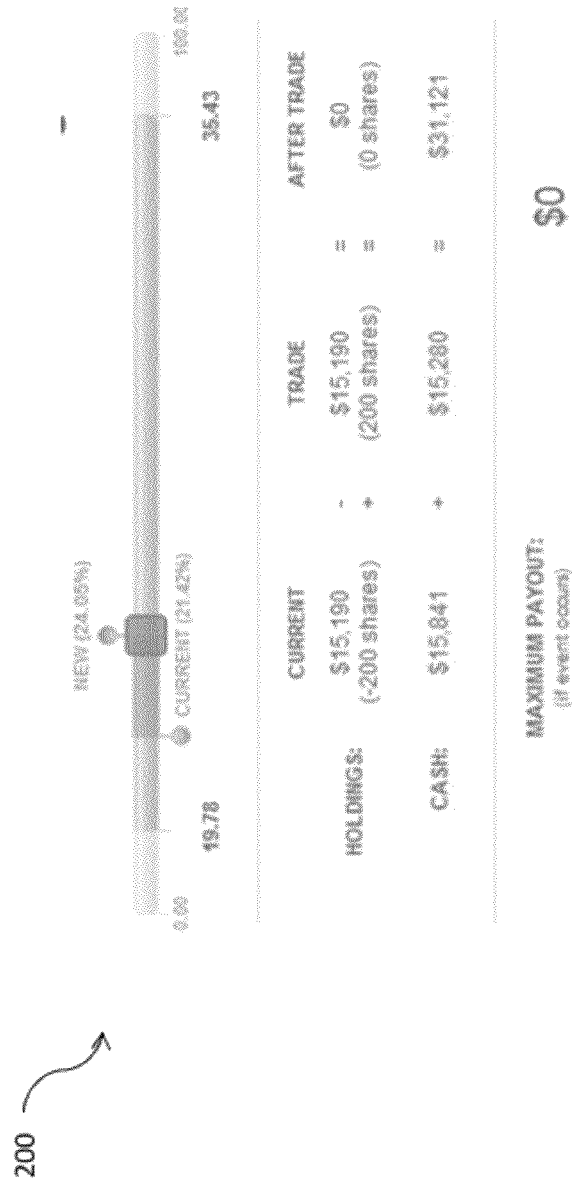
FIG. 8 is another example use of the slider interface.

Example #4, shown in FIG. 8: After the trader's third transaction, another trader moves the consensus from 23.15 to 21.42. This is further in the direction that the first trader moved the consensus, thus they could potentially profit from being ahead of the consensus. If the trader eliminates their full position at this point, they will buy (cover) the 200 shorted shares, thus moving the consensus back up to $24.05. The transaction would net a gain of $15,280 in cash from the transaction.

The present system differs from a real market, in that orders are not being matched in real market. The system is filling orders, not the other investors. The present system behaves more like a futures market selling naked options, in that futures options are always available even though the seller may not possess the asset. Thus, the system provides an automated market maker (AMM). The automated market maker also allows for double auction by incorporating limit orders.

An investor can only move an answer (buy stock) between two limits shown on the slider bar. These limits are calculated by the system and represent the investor investing all his available points in either a short or long position. These are the lower and upper boundaries of personal investment. This feature facilitates an investor understanding how much he can invest and thus saves the investor time.

Figure 9:
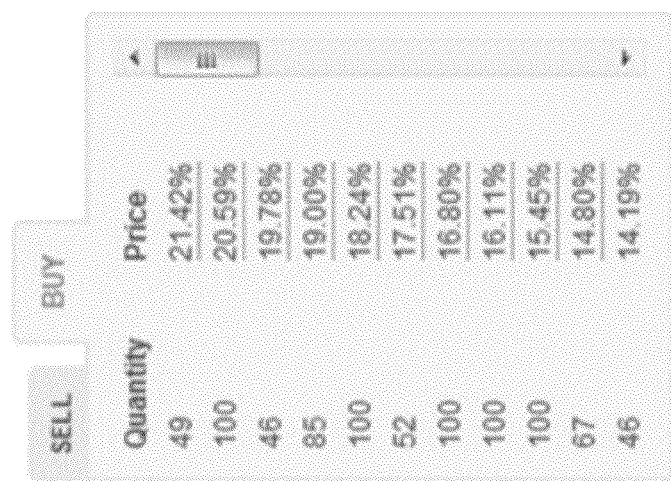
FIG. 9 is an example of an order book embodiment of the invention.

Prices are distributed in a ladder, or order book. A visualization, generally described as 300, is shown in FIG. 9. The order book steps are spaced apart logarithmically. That is, where each step represents the same number of points, the steps are wider in the middle and closer on the ends, away from the median. Therefore, more points are required to move the slider a step as the slider moves away from the median. The spacing of the steps and number of shares initially offered at each step is determined for each question via AMM configuration parameters. Thus, the automated market maker creates liquidity in the system by providing ongoing buy and sell orders that are logarithmically spaced in a price ladder.

The slider interface can also be used in actual market transactions. An investment transaction interface for trading actual shares in a stock and commodities exchange includes a slider for choosing the amount of money to invest or divest. The interface calculates the amount of stock the user is to receive or sell. This interface permits buying and selling shares with the same slider in a single action. Furthermore, the interface permits the buying and selling of shares and/or options with the same slider in a single action. In these embodiments, the limits are the available money in the user's account and/or the stock or options the user has available to sell. The prices are the actual prices that other buyers and sellers of the stock have chosen.

Payout

Investors holding a stock receive a payout once the correct answer to a question has been determined. There are two types of payout schemes—binary and variable.

A binary payout scheme is used when there are only two answers to a question, such as "yes or no". If the investor chooses the correct answer, he receives $100. If he chooses the incorrect answer, he gets nothing ($0). Whether an investor chooses a correct or incorrect answer depends on his direction of movement of the consensus. If he moves the consensus towards the correct answer, then he wins. If he moves the consensus towards the incorrect answer, he loses. The net profit/loss for answering the question depends on the price paid for the shares to answer the question.

A variable payout scheme is used when the answer to the question is not binary. For example, when determining an event date, a range of dates can be offered as answers. How close an answer is to the actual event date determines the amount of payout. The variable payout range is between $0 and $100. The payout is simply given to the trader for each share held. For example, a trader holding 10 shares that are paid out at $70 is given $700 cash for their shares. The net profit/loss to the trader is determined by the average cost basis of their shares held at time of redemption. For example, if the trader holds 10 shares with an average cost basis of $60 and the redemption price is $70, then the trader will net a profit of 10 shares×$10 profit/share=$100.

Grouping Stocks

Stocks that are related can be grouped together such that an investor can view them as a group. Stocks can be grouped in two configurations: independent or linked.

Figure 11:
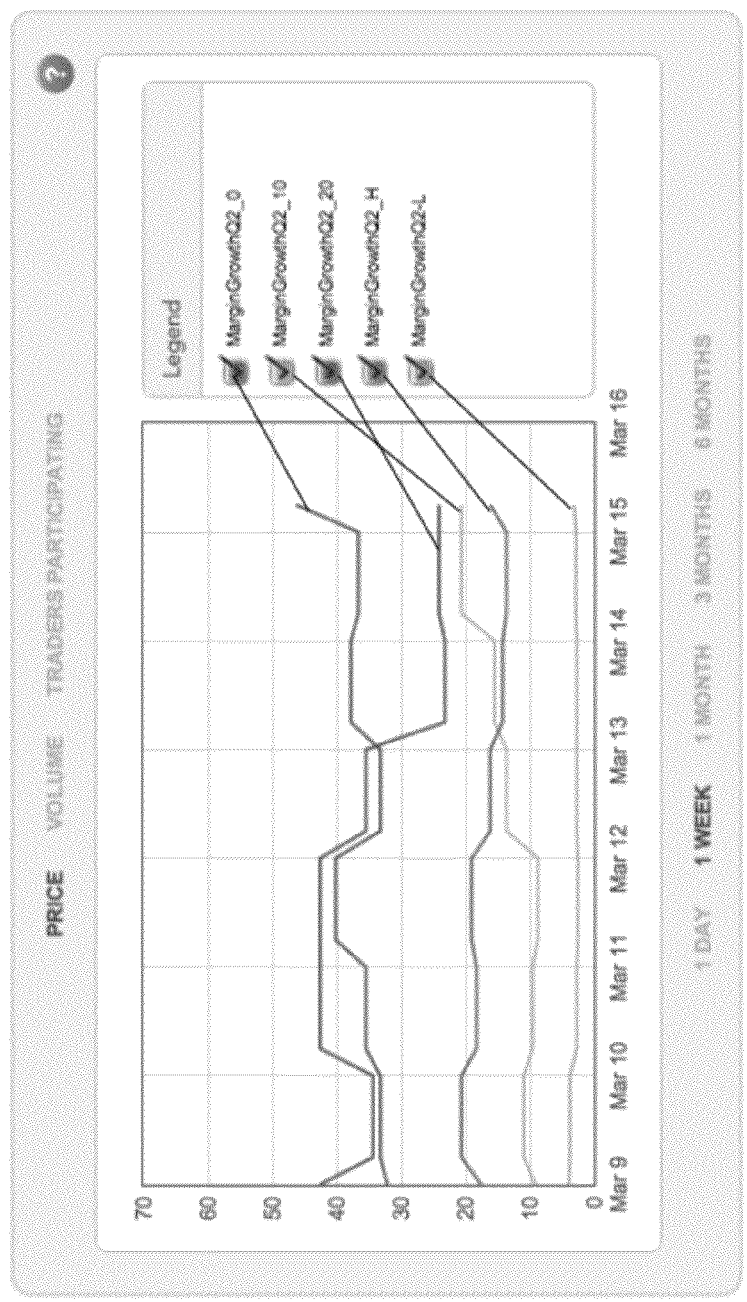
FIG. 11 is an example of graphing stock trends according to the invention.

For example, as shown in FIG. 10, there are 5 predictions for margin growth in the second quarter—less than 0%, 0-10%, 10-20%, 20-30%, greater than 30%. The stocks are linked together such that the sum of the probabilities is 100. FIG. 11 shows the trends for these stocks.

Figure 12:
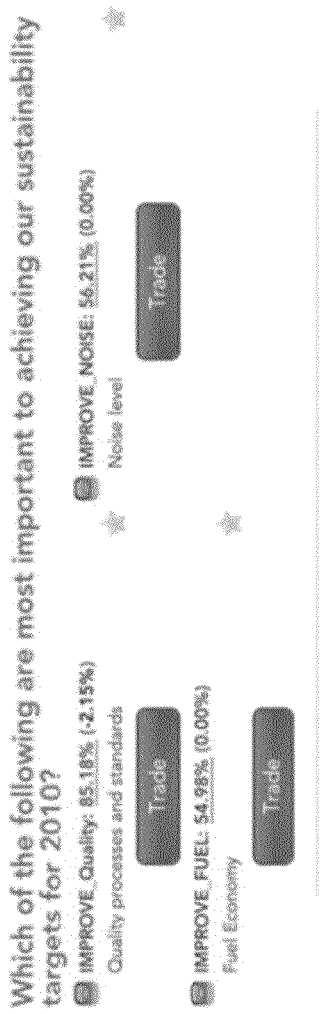
FIG. 12 is an example of grouping stocks according to the invention.

Additionally, related stocks can be grouped together but not linked, thereby maintaining independent consensuses. FIG. 12 shows the probabilities for each of the stocks in a grouped, unlinked set of stocks.

In certain scenarios, using stocks in linked sets provide some very important benefits when compared with simple binary prediction markets. The example shown in FIG. 10 could be created using five discrete stocks, but the informational value that a decision maker hopes to receive from the market would be reduced due to this fundamental inefficiency. By using an algorithm to automatically adjust these prices, it provides a greater level of clarity that enables a decision to be made with more certainty about the future outcome. This clarity comes from the fact that the linked prices represent a distribution curve across all the possible outcomes.

An added benefit of this approach is that it's more intuitive to the user. This allows people to take advantage of the knowledge they might have about a portion of the distribution, instead of requiring them to know about the entire range of possibilities. Said another way in the context of the example shown in FIG. 10, I might not know specifically how much sales we're going to have in April, but I know that it's going to be less than 10 million, so I'm going to push the probability of that event upward. As a result of doing this, my actions influenced the prices of the other two stocks and thus make the market more efficient, or, in other words, make the market more accurate.

Liquidity Management Process

For the proper functioning of the system, a sufficient, but not excessive, amount of liquidity should be available to investors. Investors' liquidity is managed to prevent the following: uninformed gambling; manipulating the market; and introducing excessive market volatility; thereby investors will tend to only invest in what they know if they can't invest in everything. These investing behaviors result in incorrect disagreement information being received from the investors and are therefore undesirable and make the prediction system inaccurate. However, sometimes active traders are given more points because they could provide more information if allowed more liquidity. For example, over a time period, a trader may have made poor choices, lost points and thereby reduced their influence in the market. Since new questions are introduced regularly into a market, it would be advantageous to have this trader still be capable of participation since they may have information about the new questions. A suitable default amount for new traders has been determined to be 100,000 points, which works well when other constraints of the system are set to the default settings, as describe elsewhere in this document.

As an example of too much liquidity in a case study, an administrator gave 900,000 points to each investor. With so much money, the investors introduced significant volatility into the market and made it difficult for the system to produce good predictions. Thus, importantly in the present invention, three values an administrator needs to evaluate to ensure proper functioning of the system include: How much money to give each investor; how many questions to allow into the marketplace; how many participants will be in the marketplace.

Currently, there is no way to distinguish between agreement with consensus and lack of funds to invest. Therefore, the administrator needs to manage liquidity settings in order to provide enough liquidity so that all answers receive investment by investors who are potentially informed enough to make an investment, but not so much that investors can invest beyond their informed ability. Thus, each investor should not receive enough money to invest heavily in all questions because an investor probably does not have sufficient information to answer all questions truthfully.

The prediction markets and algorithms of the present invention provide administrative control on where to start, sensitivity, how much leeway to provide the fulcrum at the middle, for example, whether to make the settings more like a normal (Gaussian) distribution curve, such that it is harder to get to extremes on the bell curve, because it is desirable to not give any user too much liquidity. Also, the present invention facilitates the administrator controls questions like: How hard or easy to move the probability at the midsection versus the endpoints of the curve, the type and numbers of questions, and the like.

In addition to the previous considerations, the system provides for control of the following parameters in order to manage liquidity:

Sensitivity: The sensitivity is a number from 1 to 100 that determines how closely-spaced the market maker's buy and sell orders are placed. Low values mean that there are larger gaps between orders, so the stock's price will move quickly. High values mean there are smaller gaps between orders, so the stock's price will be harder to move.

Quantity: The number of shares the market maker offers for each of its orders.

Fulcrum: The starting price around which the market maker places its orders. Sell orders are placed above this price, buy orders are placed below it.

Window: How many orders the market maker maintains at a time. A window of 10 means the market maker will maintain 10 buy and 10 sell orders at a time, replenishing them when a human trader matches them.

Advantageously, the systems and method of the present invention use known complicated algorithm for prediction markets, but the slider user interface greatly simplifies the user interface, namely by providing mechanisms for doing everything with one single movement of the slider.

The present invention has default settings, arrived at through experimentation, which achieve this balance. These default settings are as follows: Sensitivity—20; Quantity—100; Fulcrum—50.00; Window—30.

There are a number of benefits to having this much configurability over the liquidity settings. First of all, a market administrator can adjust the market's liquidity settings very precisely when adding or managing stocks in the market. If the market has a large volume of people, they may decide to set the liquidity very low since there are so many traders participating and the market already has a sufficient amount of liquidity. Alternatively, in times when the market has a low amount of liquidity, like when there are low numbers of traders, the administrator has the ability to boost the amount of liquidity by adjusting these variables.

In general, the volume traded is not an indication of success in prediction markets. This is because the quality of answers is more important than the quantity of investment. Remember, the purpose of the system is to uncover truthful answers; therefore, if these answers are obfuscated by an excess of liquidity, then the informed answers risk being lost.

The adjustment of the liquidity settings must also consider the number of participants. Assuming each stock, on average, costs $50/share, a participant with an initial funding of $100,000 would be able to invest in 2000 shares. Further assuming the default of 100 shares per price unit, this indicates a participant could move 20 different stocks 10 price steps each. Given they would not have knowledge of all stocks in market, a market with 50 concurrently active stocks would present the participant with 20 stocks they would be interested in investing.

Administrator Interface

Figure 13:
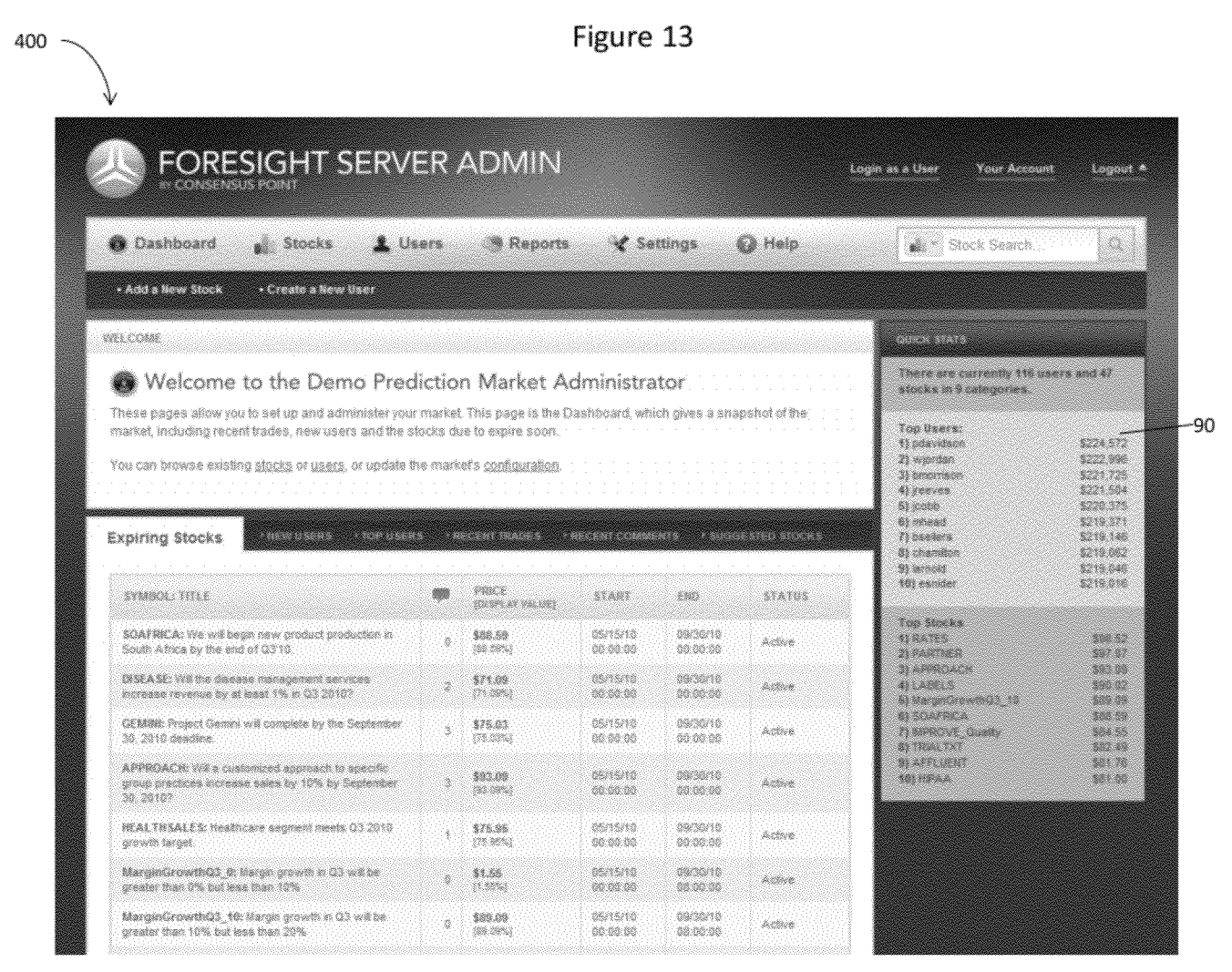

The administrative interface includes pages for administering stocks, users, markets and the like and for generating reports. A dashboard page, generally described as 400 in FIG. 13, is preferably available. It preferably gives data for the market, including recent trades, new and top users, stocks due to expire, and the like. An optional sidebar 90 shows other relevant information, in this example the top users and the top stocks.

Figure 14:
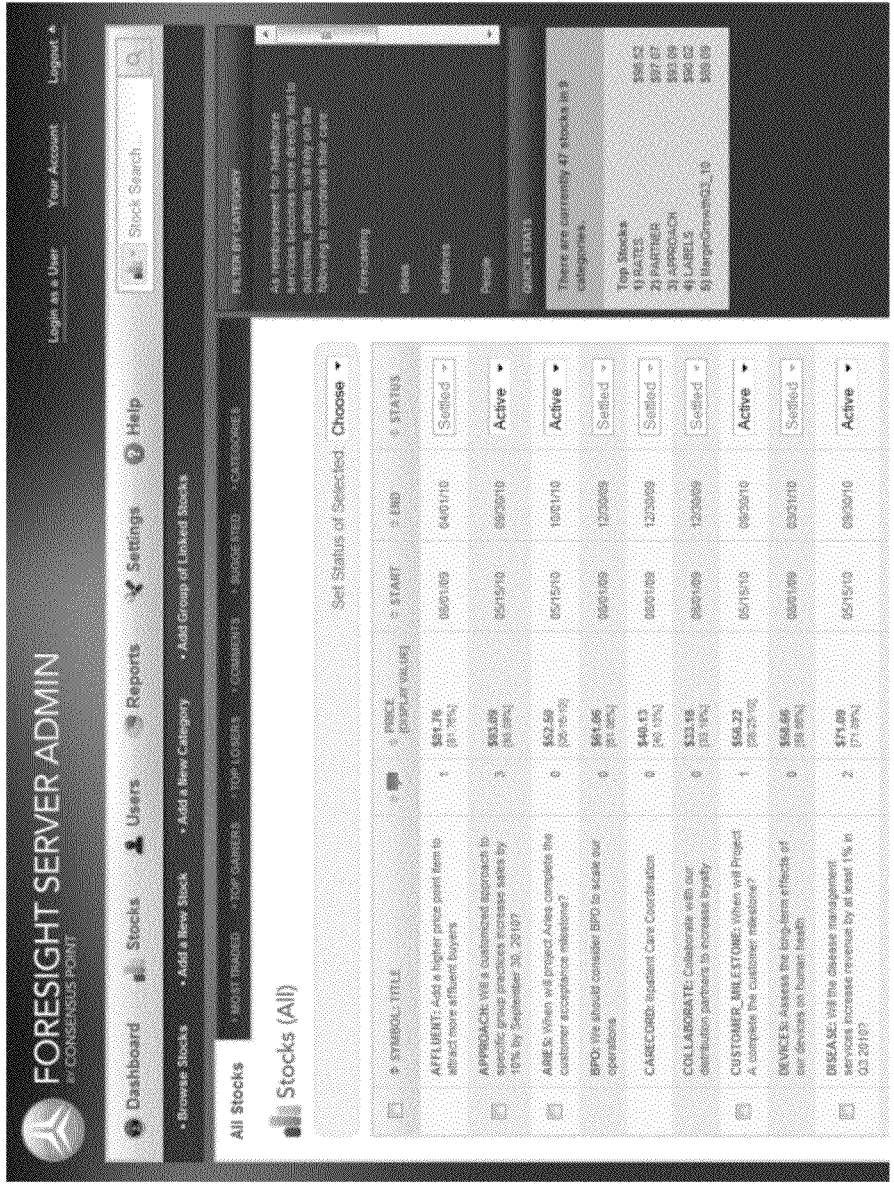
FIG. 14 is an example of the stock page interface of the invention.

The stock pages (FIG. 14) include pages for showing the stocks in various reports and categories and relevant stock information, including all stocks, most traded, top gainers and losers, comments, suggested stocks, categories, and the like. The status of each stock can be set through this interface.

Figure 15:
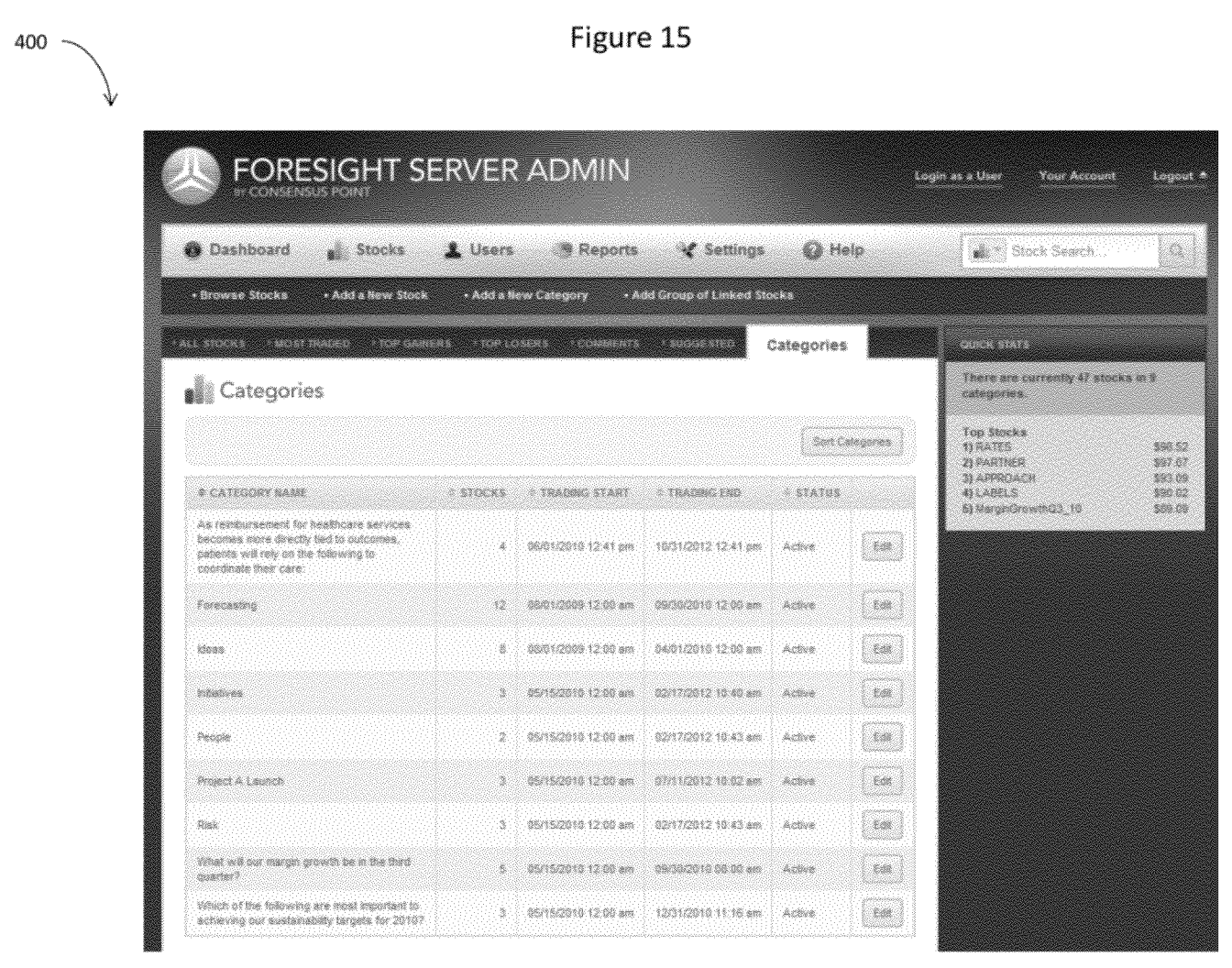

The Dashboard Stock Categories pages (FIG. 15) shows the categories used and relevant information for each category, such as name, number of stocks, starting and ending date/time of trading, and the status.

Figure 16:
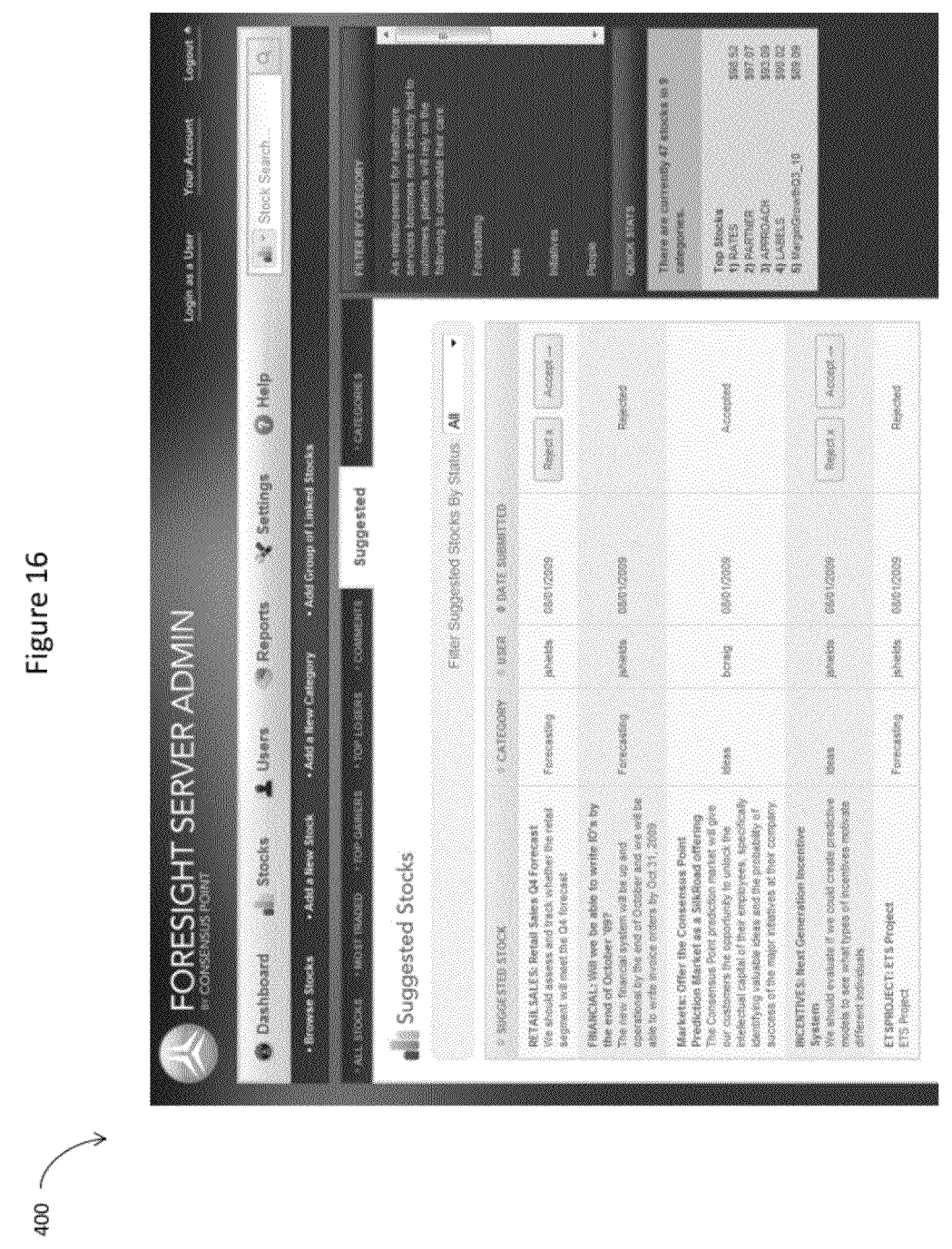

The Dashboard Suggested Stocks pages (FIG. 16) shows the suggested stocks, including a name and brief description, category, suggesting user, submission date, and status (accepted/rejected). Stocks can be accepted or rejected through this page.

Figure 17:
FIG. 17 is an example of the category addition interface of the invention.

Categorizing stocks is useful and permits the administrator and users to quickly look at a related group of questions/stocks. To add a category, the administrator opens the appropriate form (generally described as 500 in FIG. 17) and generally needs to provide the following: a name; determine if there is an investment limit; provide a start and end date; select a display value type and, if appropriate, a display value range; chose the status (active/inactive) and indicate if the category is grouped.

Figure 18:
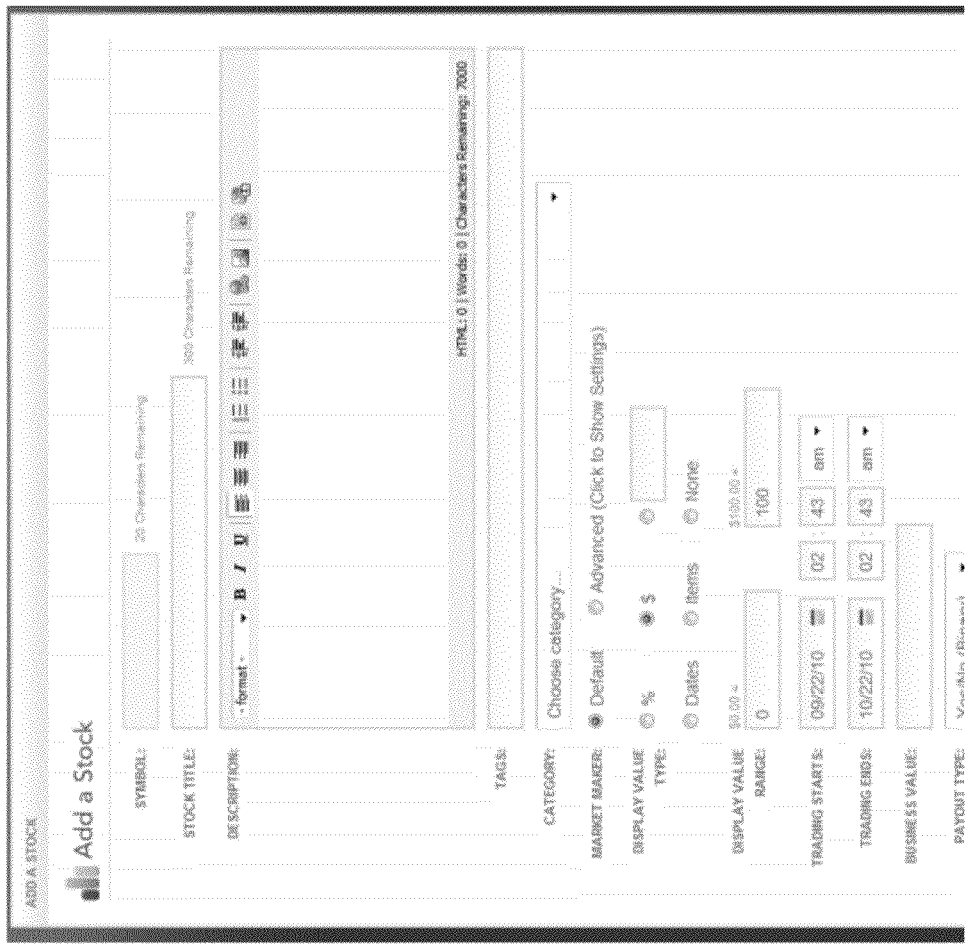
FIG. 18 is an example of the stock addition interface of the invention.

When adding a stock, the administrator opens the appropriate page (generally described as 600 FIG. 18) and generally needs to provide the following stock information: symbol, stock title, description, tags, category, market maker settings, display value type and range, trading start and end dates/times, the business value, and the payout type. The Business Value is a text annotation to indicate the tangible value of the information to the organization.

Figure 19:
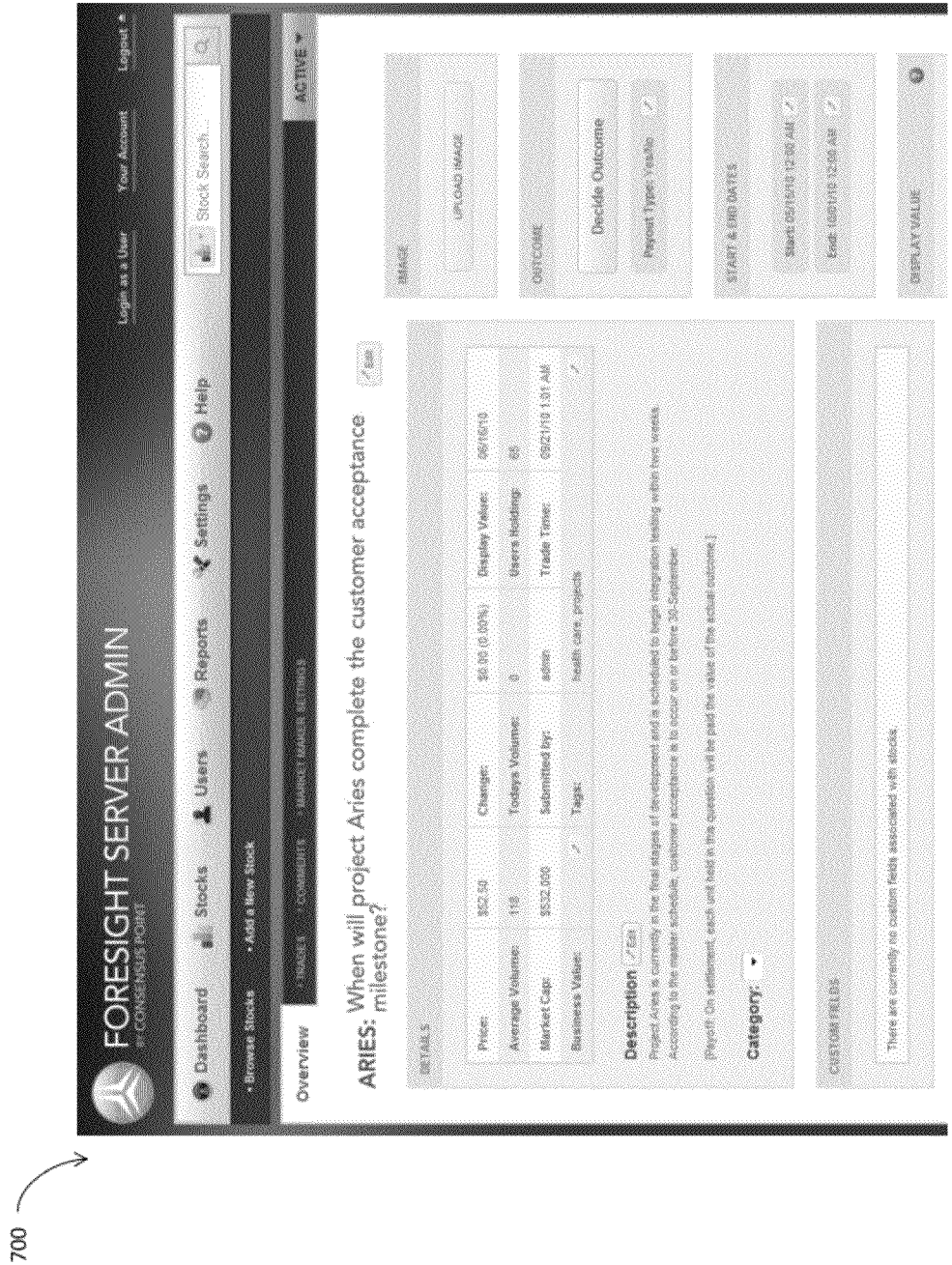
FIG. 19 is an example of an overview interface for a stock of the invention.

Each stock preferably has an overview page (generally described as 700 in FIG. 19). Included are relevant information such as price, average volume, market capitalization, price change, today's volume, submitting user, tags, display value, the number of users holding the stock, the last trade times, payout type, and start/end dates. Many of these fields are editable by the administrator. The interface also includes an outcome area, where the administrator can decide the outcome of the question/stock. Each stock also preferably has a trades pages, comments page, and market maker settings page (not shown).

Figure 20:
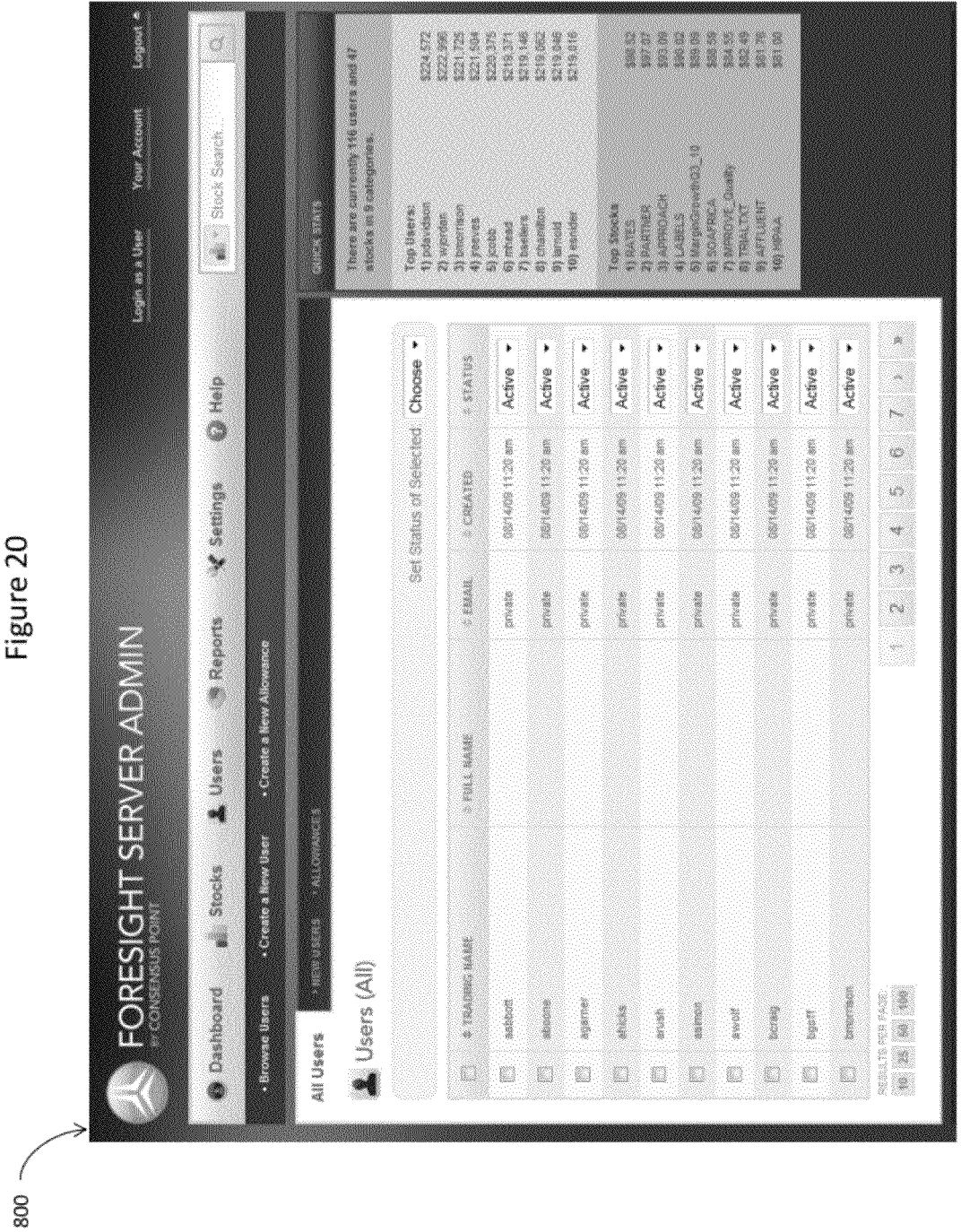
FIG. 20 is an example of a user summary interface of the invention.

The Users area gives a summary of all users (generally described as 800 in FIG. 20), preferably including their trading name, actual name, email, account creation date, and status.

New users can be created using a new user form (generally described as 900 in FIG. 21). In addition to the usual user account information (name, contact information, password, status), the administrator also assigns starting funds to a user.

Figure 22:
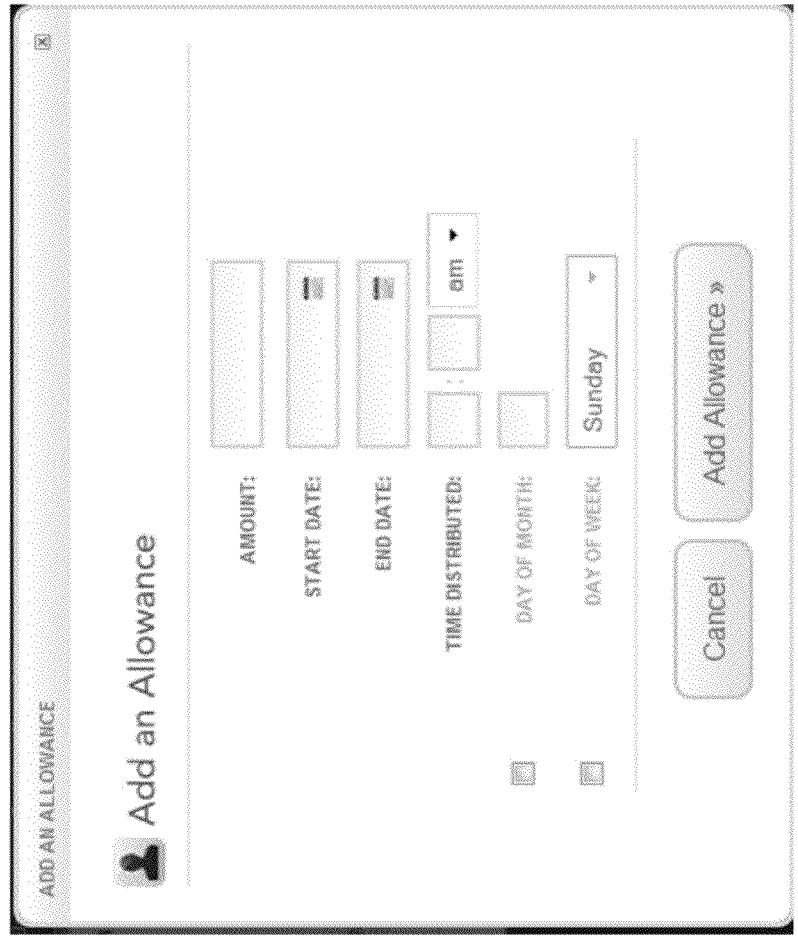
FIG. 22 is an example of an allowance creation form interface of the invention.

Once a user has been created, an allowance can be provided to the user. FIG. 22 shows an allowance creation form, generally described as 1000, which preferable include information including the allowance amount, start/end dates, distribution time, and periodicity (day of week, day of month).

Figure 23:
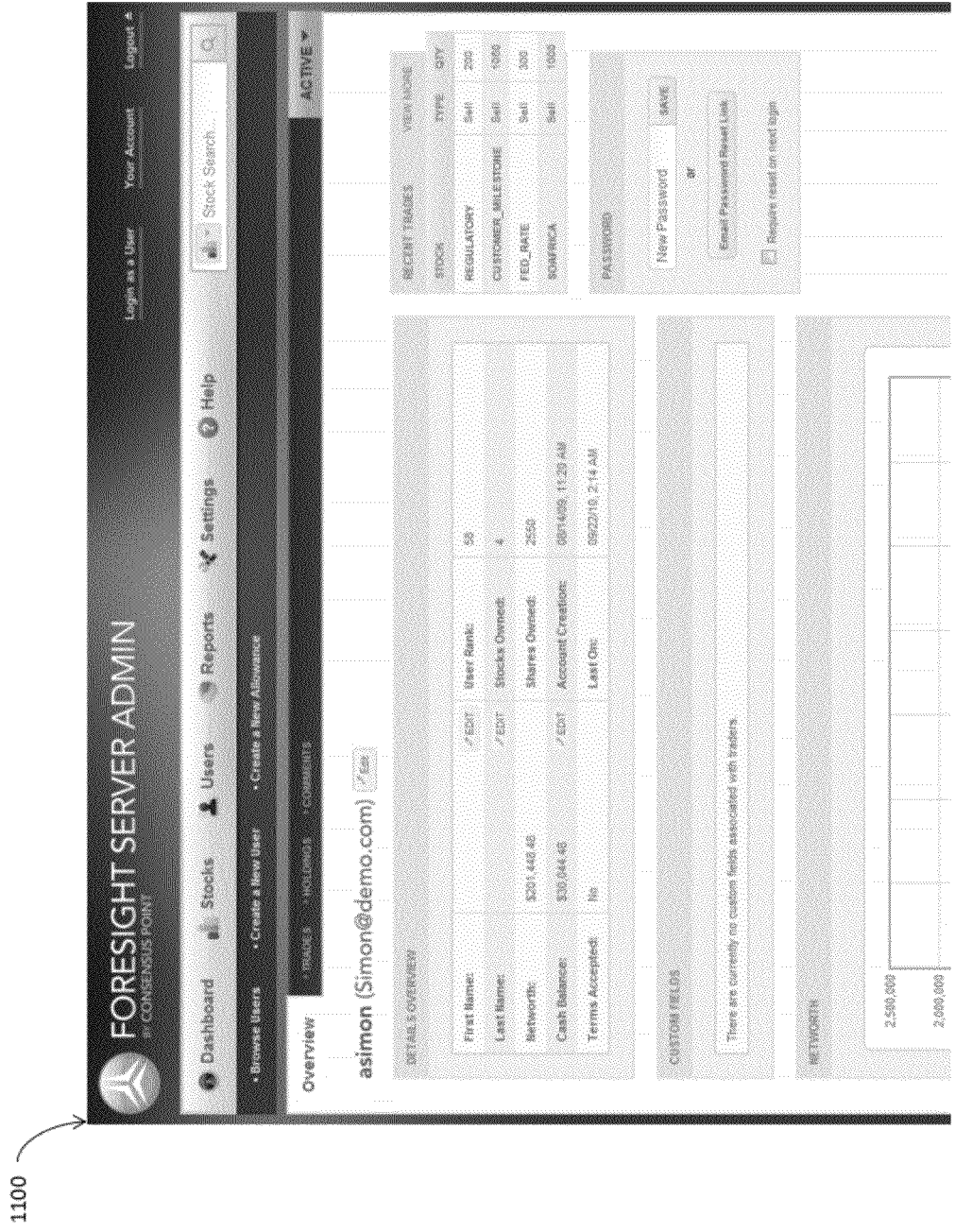
FIG. 23 is an example of an individual User Overview interface of the invention.

The Individual User Overview page provides the administrator a summary of the user's activity and holdings (generally described as 1100 in FIG. 23). More detailed information regarding trades, holdings and comments is preferably provided on other pages easily accessible from this area.

Decision Dashboard

Figure 24:
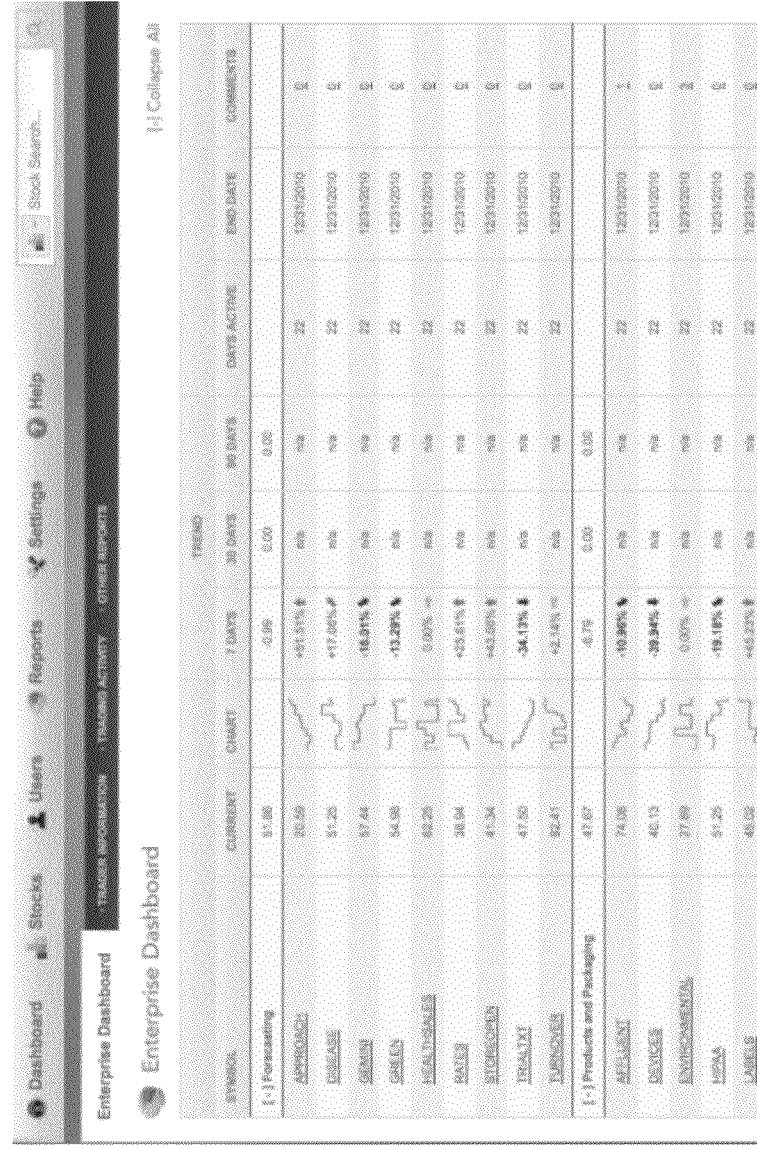
FIG. 24 is an example of a dashboard interface of the invention.

The present invention preferably includes a real-time dashboard providing overview of consensus and risk by category. As prediction markets evolve and become more effective management tools, having a comprehensive visualization of what is transpiring in the market at any given moment in time becomes very important. In the present invention platform, this is embodied in the enterprise dashboard (generally described as 1200 in FIG. 24). Available via the administrative portion of the system, the dashboard displays a wide range of relevant information on a single page. This includes the current consensus, a summarized 'Sparkline' chart which gives the user a very glanceable view of the recent trajectory in market prices, the change in market prices over the last 7/30/90 days, the number of days that a particular stock has been active, the date at which the stock will be settled, and the total number of comments that users have made about the stock.

All of the information contained in the dashboard enables decision makers to access the data they need, when they need it, in order to make judgment calls about the items that are put to the prediction market participants. Had this highly relevant information not been made available in a dashboard of this form, it is easy to imagine a scenario in which a leader might miss an opportunity to make a necessary decision at a critical time. Since the changing market prices reflect shifting confidences in the underlying questions in the market, leaders with access to this data are better prepared to take action in order to mitigate risks.

Figure 25:
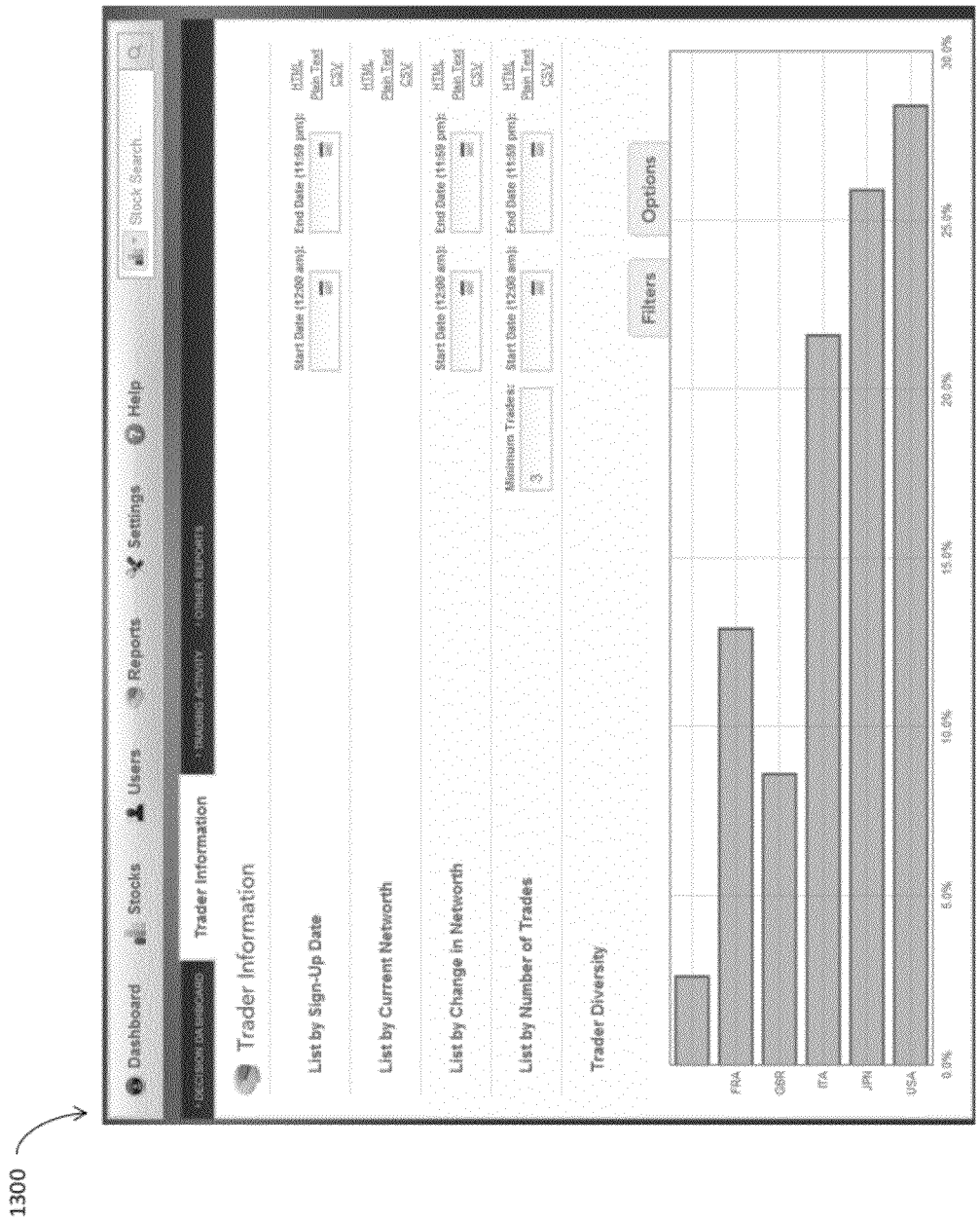
FIG. 25 is an example of a trader information report interface of the invention.

The present invention preferably includes other reports, including Trader Information, Trading Activity, and the like. FIG. 25 shows the Trader Information Report interface, generally described as 1300. Here the administrator can create reports that sort traders by various parameters, such as, for example, sign-up date, current net worth, change in net worth, number of trades, trader diversity, and the like. FIG. 25 shows a report wherein the traders have been graphed by nationality versus percentage of total population. The top bar represents unassigned users.

Figure 26:
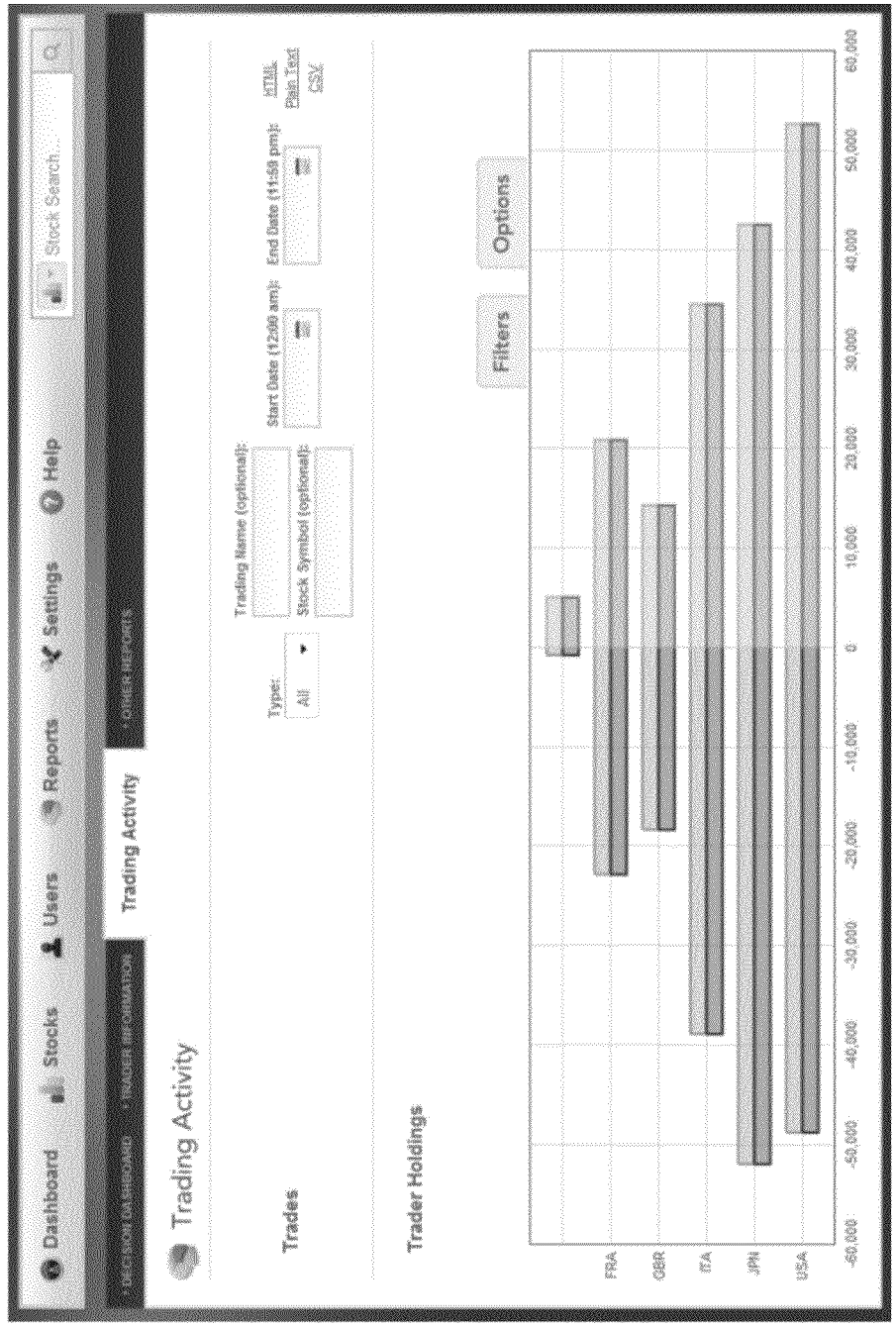
FIG. 26 is an example of a report interface of the invention.

Trading activity reports are also useful to administrators and are provided for in the present invention. Reports for different trading criteria include the types of trades, individual stock trades, start/end dates for trades, and the like. FIG. 26 shows a trading activity interface, generally described as 1400, showing a report wherein the trades have been graphed by nationality on the y-axis versus stock price on the x-axis. This type of report gives an indication of the propensity of a nationality to go long or short a stock.

Figure 27:
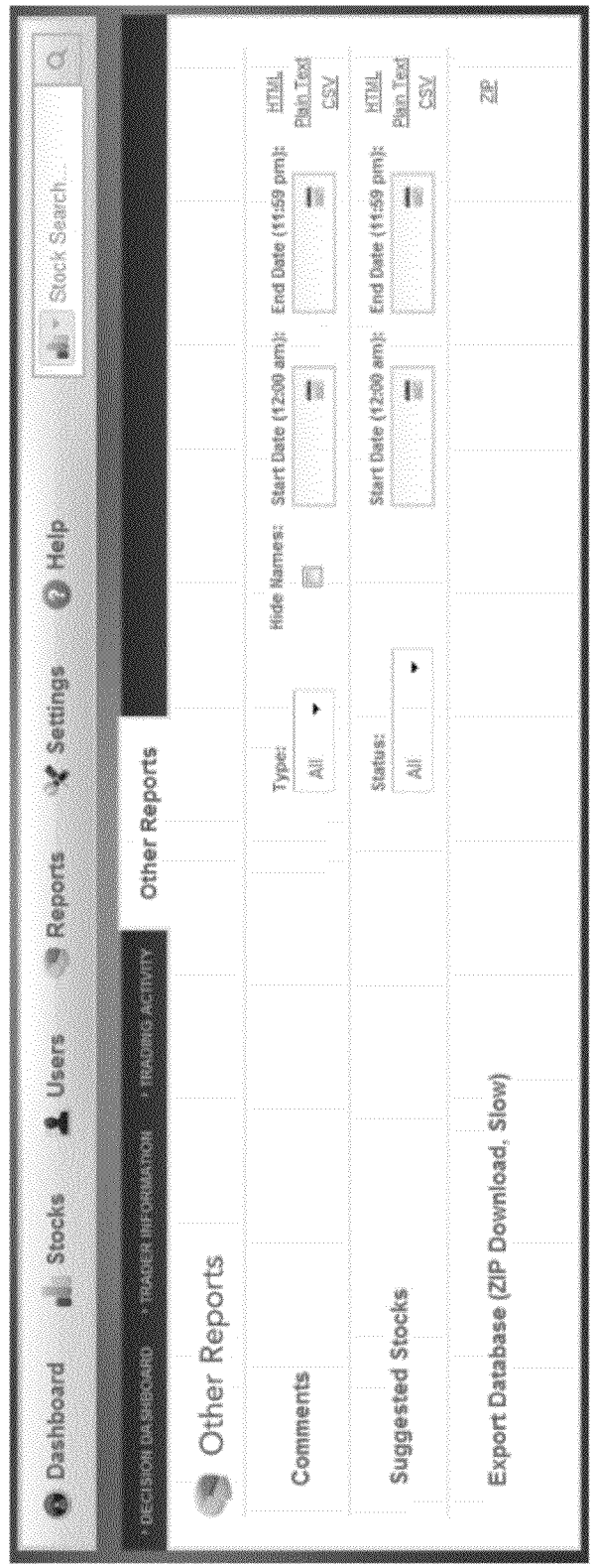
FIG. 27 is an example of a report generation interface of the invention.

Other reports provided for by the present invention include reports based on comment type, comment start/end dates, suggested stock status, suggested stock start/end dates, and the like. FIG. 27 shows an interface according to the present invention, generally described as 1500, for generating these types of reports.

Figure 28:
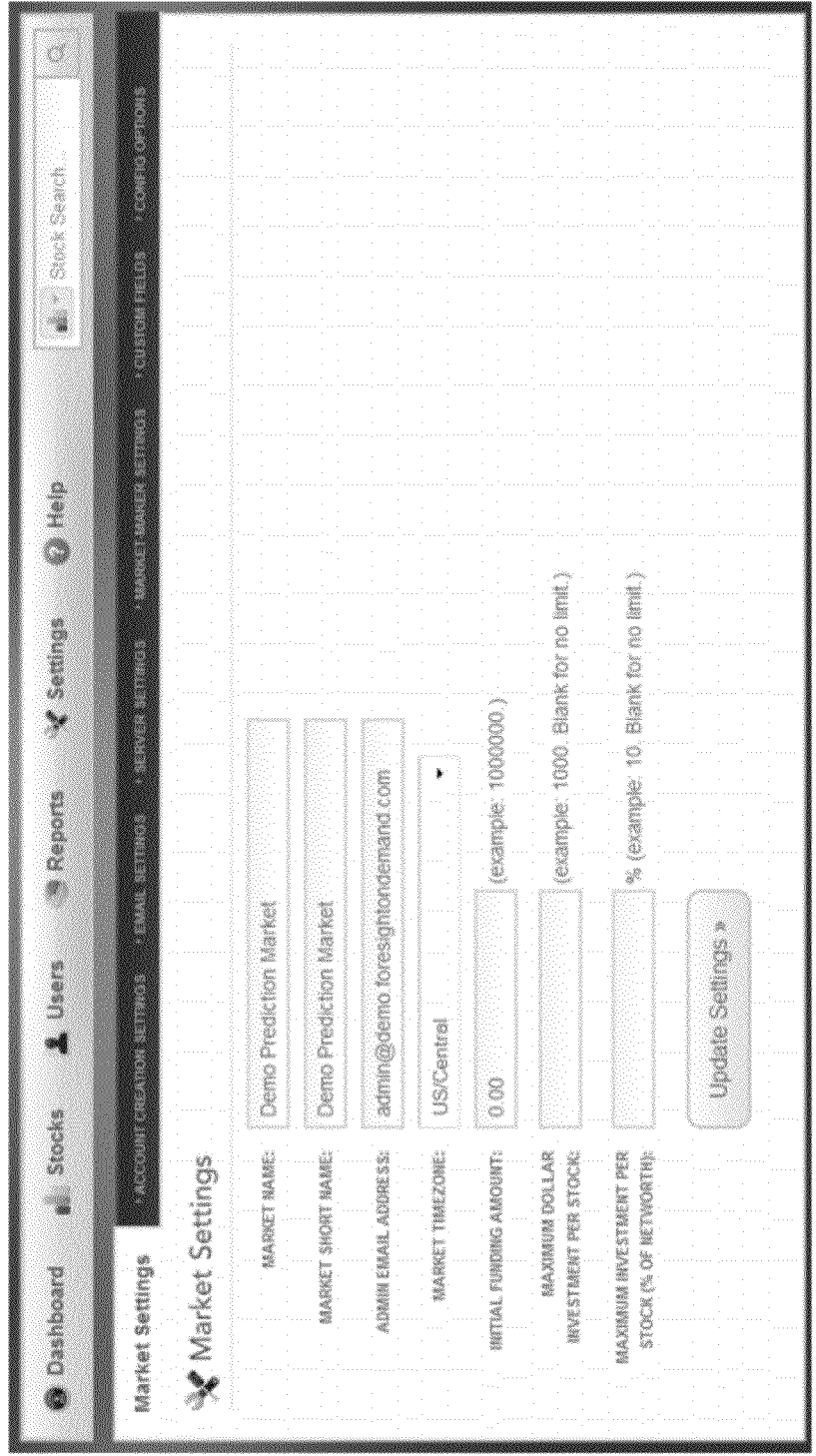
FIG. 28 is an example of a market settings interface of the invention.
Figure 29:
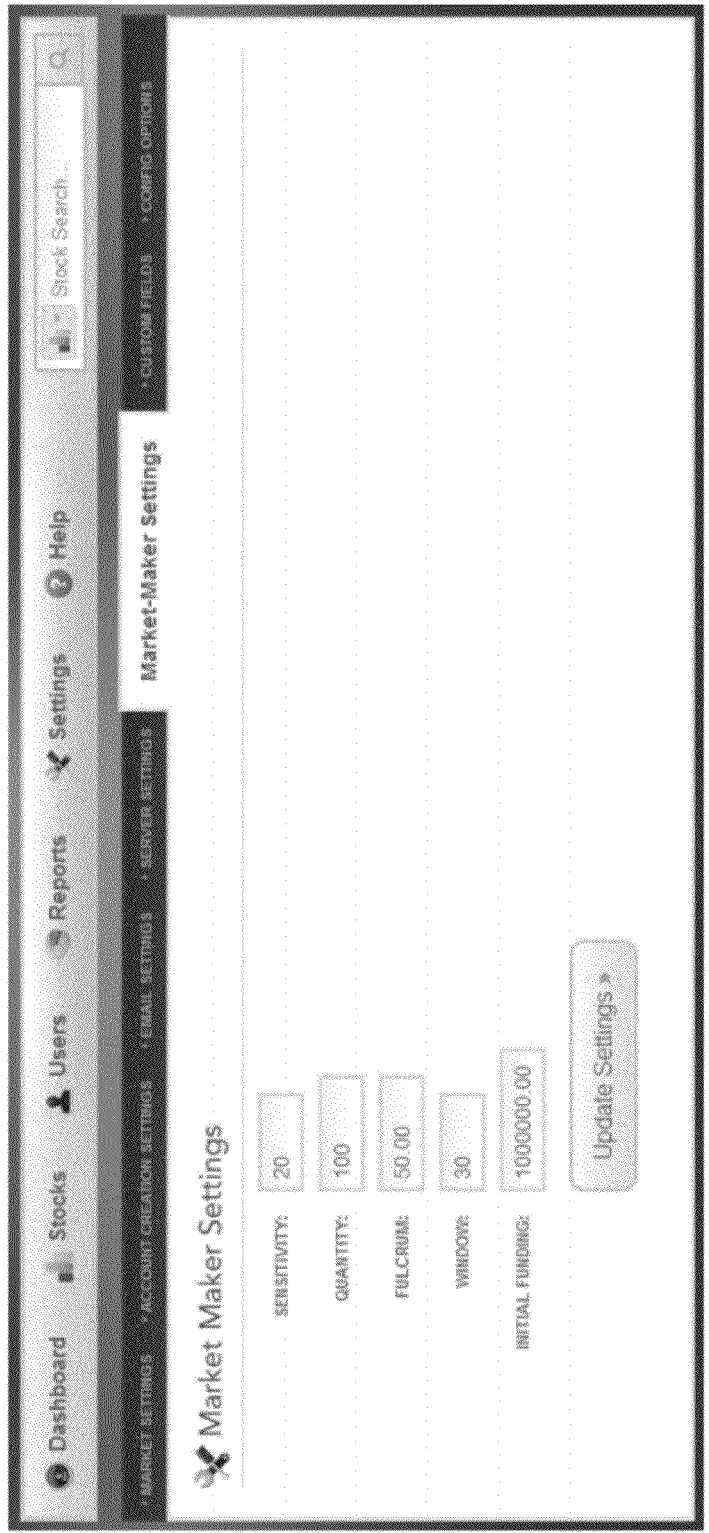
FIG. 29 is an example of a market maker settings interface of the invention.

The present invention preferably allows an administrator to administer multiple markets. Different markets can be created for specific purposes. Each market is configured by the administrator, including the market settings (generally shown as 1600 in FIG. 28), account creation settings, email settings, server settings, and market maker settings (generally described as 1700 in FIG. 29). The market maker setting includes the settings as previously described for the default settings. Furthermore, the market maker settings preferably include an initial funding setting.

In one embodiment of the present invention, the system includes a prediction market system operable (via software and/or applications directly or indirectly functioning) on a server computer having a processor, a memory, a power source, input/output devices, and at least one database in electronic, digital communication over a network, and connectable or accessible remotely through the network by at least one other remote computing device, which also has a processor, a memory, a power source, input/output devices, and constructed and configured for network-based digital communication over the network, wherein the prediction market system is operable for automatically performing prediction market transactions; the prediction market system interacting with a database of profile data for a multiplicity of users.

Additionally, the present invention includes a computer-readable code stored in a storage medium and executable by one or more processors, which when executed provides a prediction market system according to the present invention.

FIG. 30 is a schematic diagram of a networked system and remote server computer associated with the systems and methods of the present invention. As illustrated in FIG. 30, a basic schematic of some of the key components of the system including remote server computer and network access to the prediction market system, according to the present invention are shown. The system 2000 includes a server 2210 with a processing unit 2111. The server 2210 is constructed, configured and coupled to enable communication over a network 2250. The server provides for user interconnection with the server over the network using a personal computer (PC) 2240 positioned remotely from the server. Furthermore, the system is operable for a multiplicity of remote personal computers or terminals 2260, 2270. For example, in a client/server architecture, as shown. Alternatively, a user may interconnect through the network 2250 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. The network 2250 may be the Internet, an intranet, or any other network suitable for searching, obtaining, and/or using information and/or communications. The system of the present invention further includes an operating system 2212 installed and running on the server 2210, enabling server 2210 to communicate through network 2250 with the users thereof. The operating system may be any operating system known in the art that is suitable for network communication.

Thus, the present invention provides for a prediction market system, the system including: a computer system including a server computer and at least one database in electronic, digital communication over a network, connectable or accessible remotely through the network by at least one other remote computing device, the server running a software providing: an automated market maker; a liquidity management system with administrative controls for the market maker for sensitivity, quantity, fulcrum and window in order to provide enough liquidity so that about all answers receive investment by investors who are potentially informed enough to make an investment, but not so much that investors can invest beyond their informed ability; an investment transaction interface, wherein the investment transaction interface is a slider interface with a slider that the user uses to choose the amount of money to invest and the interface calculates the amount of stock the user is to receive or sell; thereby providing a prediction market system that is intuitive and gives good predictions.

The automated market maker preferably creates liquidity in the system by providing ongoing buy and sell orders that are logarithmically spaced in a price ladder. The automated market maker can also provide for double auction by incorporating limit orders. The automated market maker preferably has the sensitivity setting at about 20; the quantity at about 100; the fulcrum at about 50.00 and the window at about 30.

The investment transaction interface permits buying and selling shares with the same slider in a single action. The payout is either binary or variable. The stocks are grouped and can be linked.

The present invention further includes a computer-readable code stored in a storage medium and executable by one or more processors, which when executed provides a prediction market system that includes: an automated market maker; a liquidity management system with administrative controls for the market maker for sensitivity, quantity, fulcrum and window, in order to provide enough liquidity so that about all answers receive investment by investors who are potentially informed enough to make an investment, but not so much that investors can invest beyond their informed ability; an investment transaction interface, wherein the investment transaction interface is a slider interface with a slider that the user uses to choose the amount of money to invest and the interface calculates the amount of stock the user is to receive or sell; thereby providing a prediction market system that is intuitive and gives good predictions.

The present invention further includes a computer-readable code stored in a storage medium and executable by one or more processors, which when executed provides an investment transaction interface for an electronic stock and commodities exchange, the interface including a slider for choosing the amount of money to invest or divest and wherein the interface displays the amount of stock the user is to receive or sell.

The investment transaction interface preferably permits buying and selling shares with the same slider in a single action. The investment transaction interface can also permit the buying and selling of shares and/or options with the same slider in a single action.

Certain modifications and improvements will occur to those skilled in the art upon a reading of the foregoing description. For example, while each of these functions is described on an interface, many of the functions can be moved to another interface or to a new interface. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:
1. A prediction market system comprising:
a computer system comprising a server computer and at least one database in electronic, digital communication over a network, connectable or accessible remotely through the network
by at least one other remote computing device, the server running a software providing: an automated market maker;
a liquidity management system (LMS) with administrative controls for the market maker for sensitivity, quantity, fulcrum and window that adjust a liquidity value;
an investment transaction interface comprising an interactive slider interface with a slider control that allows one-step user selection to choose the amount of stock the user is to buy or sell;
wherein the sensitivity is about 20; the quantity is about 100; the fulcrum is about 50.00 and the window is about 30;
wherein the slider movement in a first direction indicates selling and slider movement in the opposite direction indicates buying and wherein the automated market maker automatically calculates and displays in the investment transaction interface the amount of stock the user is to receive or sell; thereby providing a prediction market system that is intuitive and gives good predictions.

2. The system of claim 1, wherein the automated market maker creates liquidity in the system by providing ongoing buy and sell orders that are logarithmically spaced in a price ladder.

3. The system of claim 1, wherein the automated market maker provides for double auction by incorporating limit orders.

4. The system of claim 1, wherein the investment transaction interface permits buying, selling and short-selling stock with the same slider in a single action; wherein the slider action in a first direction indicates selling or short-selling and slider action in the opposite direction indicates buying.

5. The system of claim 1, wherein the system provides a payout and the payout is binary or variable.

6. The system of claim 1, wherein the stocks are grouped.

7. The system of claim 6, wherein each of the stocks in the group has a percent probability and the grouped stocks are linked such that the sum of the percent probabilites is 100.

8. A computer-readable code stored in a non-transitory storage medium and executable by one or more processors, comprising:
    a prediction market system comprising: an automated market maker;
    a liquidity management system with administrative controls for the market maker for sensitivity, quantity, fulcrum and window, that adjust a liquidity setting;
    wherein the sensitivity is about 20; the quantity is about 100; the fulcrum is about 50.00 and the window is about 30;
    an investment transaction interface, wherein the investment transaction interface is a slider interface with a slider that allows the user to move the slider to choose the amount of stock the user is to buy or sell; wherein the slider action in a first direction indicates selling or short-selling and slider action in the opposite direction indicates buying; and
    the system automatically calculates and displays in the investment transaction interface the amount of stock the user is to receive or sell; thereby providing a prediction market system that is intuitive and gives good predictions.

9. The computer-readable code of claim 8, wherein the investment transaction interface comprises an interactive slider interface with a slider control that allows one-step user selection to choose the amount of stock to buy or sell and wherein the automated market maker automatically calculates and displays in the investment transaction interface the amount of stock the user is to receive or sell.

10. The code of claim 8, wherein the investment transaction interface permits the buying, selling and short selling of shares and options with the same slider in a single action.

11. A computer-readable code stored in a non-transitory storage medium and executable by one or more processors, comprising:
    an electronic stock and commodities exchange system, the exchange system comprising:
        liquidity controls for sensitivity, quantity, fulcrum and window, that adjust a liquidity setting;
        wherein the sensitivity is about 20; the quantity is about 100; the fulcrum is about 50.00 and the window is about 30;
        an interactive user investment transaction interface;
        the interface comprising a slider for choosing the amount of shares to buy or sell, the slider permitting buying and selling shares in a single action; wherein the slider action in a first direction indicates selling or short-selling and slider action in the opposite direction indicates buying; and wherein the interface displays the amount of stock and/or commodities the user is to receive or sell.

12. The code of claim 11, wherein the investment transaction interface permits the buying and selling of options with the same slider in a single action.

13. The code of claim 11, wherein the investment transaction interface comprises an interactive slider interface with a slider control that allows one-step user selection to choose the amount of stock to buy or sell and wherein the exchange system automatically calculates and displays in the investment transaction interface the amount of stock the user is to buy or sell or short sell.

* * * * *